(12) United States Patent
Yasrebi et al.

(10) Patent No.: US 8,125,999 B2
(45) Date of Patent: Feb. 28, 2012

(54) SYSTEMS AND METHODS TO MINIMIZE CUSTOMER EQUIPMENT DOWNTIME IN A VOICE OVER INTERNET PROTOCOL (VOIP) SERVICE NETWORK

(75) Inventors: Mehrad Yasrebi, Austin, TX (US); James Jackson, Austin, TX (US); Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 395 days.

(21) Appl. No.: 12/130,593

(22) Filed: May 30, 2008

(65) Prior Publication Data

US 2009/0296567 A1 Dec. 3, 2009

(51) Int. Cl.
*H04L 12/28* (2006.01)

(52) U.S. Cl. ........................................ 370/401; 709/223
(58) Field of Classification Search .................. 370/401
See application file for complete search history.

(56) References Cited

U.S. PATENT DOCUMENTS

| | | | |
|---|---|---|---|
| 5,884,024 A | 3/1999 | Lim et al. | |
| 6,496,511 B1 | 12/2002 | Wang et al. | |
| 6,546,425 B1 | 4/2003 | Hanson et al. | |
| 6,678,265 B1 | 1/2004 | Kung et al. | |
| 6,687,360 B2 | 2/2004 | Kung et al. | |
| 6,917,610 B1 | 7/2005 | Kung et al. | |
| 7,136,645 B2 | 11/2006 | Hanson et al. | |
| 7,136,654 B1 | 11/2006 | Hogberg et al. | |
| 7,162,236 B2 | 1/2007 | Dorenbosch et al. | |
| 7,293,107 B1 | 11/2007 | Hanson et al. | |
| 7,747,451 B2 | 6/2010 | Keohane et al. | |
| 7,747,751 B2 | 6/2010 | Chen | |
| 2002/0186696 A1 | 12/2002 | Lim | |
| 2003/0212800 A1 | 11/2003 | Jones et al. | |
| 2004/0208159 A1* | 10/2004 | Jung et al. | 370/346 |
| 2005/0003765 A1 | 1/2005 | Alfano et al. | |
| 2005/0111486 A1* | 5/2005 | Lee et al. | 370/465 |
| 2005/0177515 A1 | 8/2005 | Kalavade et al. | |
| 2005/0276272 A1 | 12/2005 | Arai | |
| 2006/0009213 A1 | 1/2006 | Sturniolo et al. | |
| 2006/0039355 A1 | 2/2006 | Rao et al. | |
| 2006/0077984 A1* | 4/2006 | Sakai et al. | 370/395.52 |
| 2006/0104280 A1 | 5/2006 | Carolan et al. | |
| 2006/0120287 A1 | 6/2006 | Foti et al. | |
| 2006/0121894 A1 | 6/2006 | Ganesan | |
| 2006/0123079 A1 | 6/2006 | Sturniolo et al. | |
| 2006/0140164 A1 | 6/2006 | Patel et al. | |

(Continued)

OTHER PUBLICATIONS

J. Rosenberg, "A Session Initiation Protocol (SIP) Event Package for Registrations," Mar. 2004, 25 pages. http://www.ietf.org/rfc/rfc3680.txt.

(Continued)

*Primary Examiner* — Kevin C Harper
(74) *Attorney, Agent, or Firm* — Hanley, Flight & Zimmerman, LLC

(57) ABSTRACT

Systems and methods to minimize customer premises equipment downtime in a Voice over Internet Protocol service network are disclosed. An example method comprises receiving a replacement internet protocol (IP) address to replace a first IP address in a residential gateway associated with a first network service provider, sending a re-authenticate message from the residential gateway to a customer premises equipment associated with a second network service provider, and receiving the re-authenticate message in the customer premises equipment.

22 Claims, 11 Drawing Sheets

U.S. PATENT DOCUMENTS

| | | |
|---|---|---|
| 2006/0142008 A1 | 6/2006 | Lee et al. |
| 2006/0173781 A1* | 8/2006 | Donner ............................ 705/50 |
| 2007/0002833 A1 | 1/2007 | Bajic |
| 2007/0008931 A1 | 1/2007 | Yamamoto et al. |
| 2007/0038759 A1 | 2/2007 | Hanson et al. |
| 2007/0091907 A1 | 4/2007 | Seshadri et al. |
| 2007/0094374 A1 | 4/2007 | Karia et al. |
| 2007/0121580 A1 | 5/2007 | Forte et al. |
| 2007/0121584 A1 | 5/2007 | Qiu et al. |
| 2007/0127506 A1 | 6/2007 | Absillis |
| 2007/0286163 A1 | 12/2007 | Oka et al. |
| 2008/0101552 A1 | 5/2008 | Khan et al. |
| 2008/0117826 A1 | 5/2008 | Qiu et al. |
| 2008/0200143 A1 | 8/2008 | Qiu et al. |
| 2009/0193469 A1 | 7/2009 | Igarashi |
| 2009/0296566 A1 | 12/2009 | Yasrebi et al. |
| 2009/0300673 A1* | 12/2009 | Bachet et al. ................... 725/31 |
| 2010/0046530 A1 | 2/2010 | Hautakorpi et al. |

OTHER PUBLICATIONS

United States Non-Final Office Action, issued by the United States Patent Office in connection with U.S. Appl. No. 12/130,587, on Jul. 21, 2010, 22 pages.

Final Rejection, issued by the United States Patent and Trademark Office in connection with U.S. Appl. No. 12/130,587, on Feb. 1, 2011, 25 pages.

* cited by examiner

SYSTEMS AND METHODS TO MINIMIZE CUSTOMER EQUIPMENT DOWNTIME IN A VOICE OVER INTERNET PROTOCOL (VOIP) SERVICE NETWORK

FIELD OF THE DISCLOSURE

This disclosure relates generally to voice over Internet protocol (VoIP) networks and, more particularly, systems and methods to minimize customer equipment downtime in a VoIP service network.

BACKGROUND

Consumer Voice over Internet Protocol (VoIP) services are steadily gaining popularity. In some cases a consumer has a subscription with one network service provider for data Internet and VoIP services. A residential gateway and a customer premises equipment (CPE) device such as, for example, a VoIP phone receives service from the same network service provider. In other cases a consumer has a subscription with a first network service provider for Internet service and additionally a subscription with a second network service provider for VoIP service. In this situation the residential gateway accesses the Internet via the first network service provider while the CPE receives service via the second network service provider. In such circumstances, the CPE accesses the second network service provider through the residential gateway served by the first network service provider.

Many network service providers use dynamic Internet Protocol (IP) addresses. These network service providers change the dynamic IP addresses of subscribers from time to time (e.g., periodically) through their Dynamic Host Configuration Protocol (DHCP) servers. Typically, the first network service provider updates or changes the IP address of a subscriber by sending a new IP address to the subscriber's residential gateway. The second network service provider (which did not change the IP address) typically receives a notification of the IP address when the CPE registers the new IP address with the IP Multimedia subsystem (IMS) of the second network service provider.

DETAILED DESCRIPTION

Figure 1A:
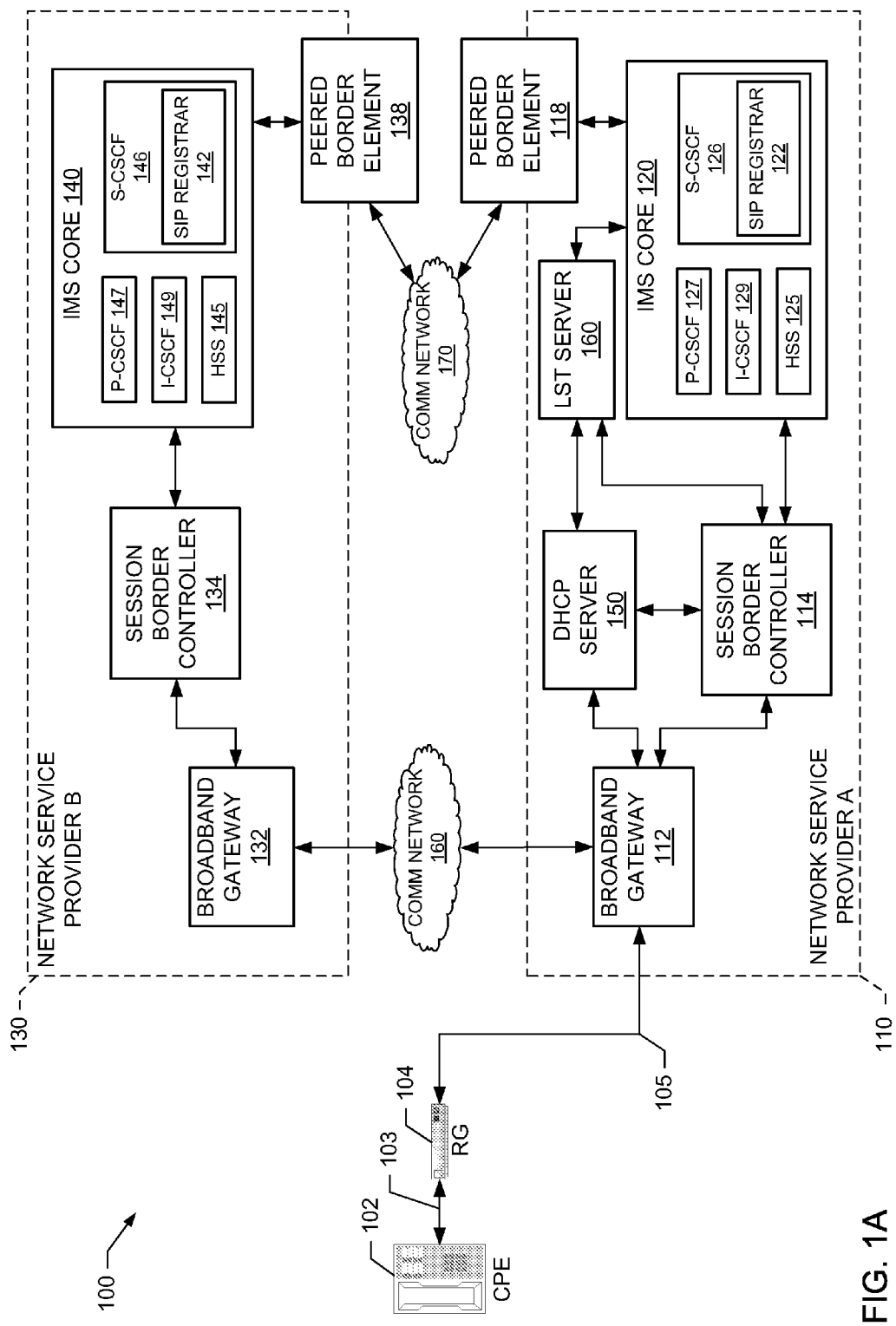
FIG. 1A is a schematic illustration of an example communication system including a CPE and a residential gateway.

Although the following describes example systems and methods including, among other components, software and/or firmware executed on hardware, it should be noted that these examples are merely illustrative and should not be considered as limiting. For example, it is contemplated that any or all of the hardware, software, and/or firmware components could be embodied exclusively in hardware, exclusively in software, exclusively in firmware, or in any combination of hardware, firmware, and/or software. Accordingly, while the following describes example systems and methods, the examples provided are not the only way to implement such systems and methods. Throughout the following disclosure a new IP address refers to a second IP address to replace a first IP address. The terms replacement, new, updated, changed, and/or second are used interchangeably when referring to an IP address.

Currently many consumers subscribe to network service provider services that use dynamic Internet Protocol (IP) addresses. These network service providers may change the dynamic IP addresses of subscribers from time to time (e.g., periodically) through their Dynamic Host Configuration Protocol (DHCP) servers. Typically, the first network service provider updates or changes the IP address of a consumer by sending a new IP address to the consumer's residential gateway. The second network service provider (which did not change the IP address) typically receives a notification of the IP address change via the CPE re-registering the updated IP address with the IP Multimedia subsystem (IMS) of the second network service provider.

Additionally, the consumer's residential gateway may provide network address translation (NAT) by linking an external dynamic or static IP address that is assigned by a first service provider to the residential gateway to a private local IP address associated with the CPE. NAT enables multiple CPEs with different private local IP addresses to share one residential gateway for Internet access. Data and/or VoIP calls transmitted via the Internet to a CPE connected to a single residential gateway are routed to the residential gateway by its dynamic IP address. The residential gateway then re-addresses the data and/or VoIP call with the private IP address of the CPE and forwards the data and/or VoIP call to the CPE. Likewise, data and/or VoIP calls transmitted from the CPE using its private IP address is received at the residential gateway. The residential gateway replaces the private IP address with its assigned dynamic IP address and forwards the transmission to the intended source.

In a typical example, a residential gateway accesses the Internet via a first network service provider using an assigned dynamic IP address while a CPE receives VoIP service from a second network service provider. The CPE includes a private local IP address used to receive and send data to the Internet through the residential gateway. Additionally, the typical CPE re-registers with the second network service provider at periodic intervals that may range from a few minutes to a few hours. During the time period between re-registering, the first network service provider sends the residential gateway a replacement IP address to replace a first IP address. The second network service provider is not updated with the replacement IP address until the CPE re-registers at the end of the time period. The CPE re-registers by sending a register message to the residential gateway which then forwards the register message to the second network service provider. Upon receiving the register message, the residential gateway also links the private IP address associated with the CPE to the replacement IP address within the residential gateway.

A period of time occurs from when the residential gateway receives the new IP address to when the new IP address is changed within the IMS of the second network service provider. This time can vary from a few minutes to a couple of hours and, in extreme cases, a few days. Assuming the second service provider is a VoIP service provider, during this time, VoIP calls directed to the consumer VoIP CPE cannot be setup and routed by the second network service provider. Specifically, the second network service provider attempts to route any such VoIP call to the last known IP address of the CPE. However, because the residential gateway and CPE have been re-addressed with a new IP address, the call is mis-addressed and, then, the call is dropped. The time between the residential gateway receiving the updated IP address and the second network service provider updating their IMS with the IP address is referred to as Lost Subscriber Time (LST). The total LST for a network service provider can total hundreds of millions of hours over the course of a year for a network service provider with tens of millions of subscribers.

Systems and methods to minimize customer premises equipment downtime in a VoIP service network are disclosed. An example method includes receiving a replacement IP address to replace a first IP address in a residential gateway that is associated with a first network service provider. The example method includes sending a re-authenticate message from the residential gateway to a CPE associated with a second network service provider and receiving the re-authenticate message in the CPE device. The example method further includes re-registering the CPE with the second network service provider immediately upon receiving the re-authenticate message.

The LST is reduced in the example method by sending the re-authenticate message from the residential gateway to the CPE and forcing the CPE to initiate a registration with its associated VoIP network service provider immediately upon receiving the re-authenticate message. Typical CPEs register with their associated network service providers after a time period. The time period may be from a few minutes to a few hours. Additionally, typical residential gateways may not send messages to CPEs. Thus, if a replacement IP address is sent to a typical residential gateway during the time between CPE registrations, the VoIP network service provider associated with the CPE will not receive the replacement IP address until the typical CPE registers at the end of the time period.

Another disclosed example method includes subscribing a CPE associated with a second network service provider to the residential gateway associated with a first network service provider. Then some time later, receiving a replacement IP address to replace a first IP address in the residential gateway in response to the residential gateway requesting an IP address and sending a re-authenticate message within a session initiation protocol (SIP) Notify message from the residential gateway to the CPE in response to the residential gateway receiving the replacement IP address. Then, receiving the re-authenticate message in the CPE and registering the CPE with the second network service provider immediately upon receiving the re-authenticate message. The CPE registers with the second network service provider by sending a register message to the residential gateway which then links a private IP address associated with the CPE to the replacement IP address and forwards the register message including the replacement IP address to the second network service provider.

Another disclosed example method includes sending a replacement IP address to replace a first IP address from a DHCP server to a residential gateway associated with a network service provider. The example method further includes sending an indication of an IP address change from the DHCP server to one or more of the VoIP components (e.g., a session border controller) of the network service provider. In a typical network service provider the DHCP server assigns a replacement IP address but does not register the replacement IP address with the VoIP components of the same network service provider. IP address registration is performed by a CPE. LST can result from the time a residential gateway receives the replacement IP address to the time the CPE device registers with its associated network service provider. The example method reduces LST by the DHCP server registering the replacement IP address with the VoIP components of the network service provider associated with the CPE device upon assigning the replacement IP address to the CPE device.

Another disclosed example method includes receiving an indication of an IP address change within a Lost Subscriber Time (LST) server, creating a database entry for the subscriber associated with the IP address change, determining whether a network transaction is a failed network transaction associated with the IP address change and storing the failed network transaction to the database entry of the subscriber. Additionally, the example method includes the network service provider analyzing the database entries for a plurality of subscribers and IP address changes to determine one or more causes to resolve customer inquiries regarding loss of service and to design improvements to correct or minimize the causes.

A disclosed example system includes a residential gateway associated with a first network service provider configured to receive a replacement IP address to replace a first IP address from a first network service provider and send a re-authenticate message to a CPE associated with a second network service provider. The CPE receives the re-authenticate message from the residential gateway and immediately re-registers upon receiving the re-authenticate message. Alternatively, the CPE may be associated with the first network service provider and re-register the replacement IP address with the first network service provider. The residential gateway may also be configured to send a replacement IP address message to an LST server.

Additionally, the disclosed example system includes a LST server associated with a network service provider configured to monitor for failed network transactions and the LST associated with IP address changes. The LST server receives an indication of an IP address change and creates a database entry for the subscriber associated with the IP address change. The LST then determines if a network transaction is a failed network transaction associated with the IP address change. If the failed network transaction is associated with the IP address change, the LST server stores the failed network transaction to the database entry of the corresponding subscriber. Additionally, the LST server analyzes the database entries to provide statistics regarding LST time for customer service inquiries, government inquiries and/or for network service provider modifications to reduce LST.

The disclosed example system also contains a DHCP server configured to send a replacement IP address message to one or more of the VoIP components within the network service provider. For example, the DHCP server may sent an indication of the IP address change to a specific session border controller that is used to route VoIP packets to and from a VoIP CPE. The session border controller may be uniquely identified by first inquiring a subscriber database to identify a particular Serving Call Session Control Function (S-CSCF) server assigned to a CPE and subsequently retrieving the address of the specific session border controller from that S-CSCF. The replacement IP address message updates the mapping of the IP address to the uniform resource locator (URL) within the network service provider without the residential gateway and/or the CPE registering with the network service provider. The DHCP server may additionally send a replacement IP address message to the LST server for tracking purposes.

The example system operates within a communication system including the first and second network service providers. In current communication systems, there are cases when a residential gateway receives a replacement IP address from its associated network service provider but the CPE connected to the residential gateway subscribes to (i.e., receives service from) a different VoIP network service provider. There is a time period, known as LST that can range from a few minutes to a few hours or longer, in which the service provider associated with the CPE is not informed or updated with the replacement IP address. The LST results from the length of time that the VoIP network service provider has not adjusted its data to reflect the updated IP address of the residential gateway. Alternatively, the CPE may be associated with the first network service provider. Thus, the LST approximately corresponds to the time from the residential gateway receiving a replacement IP address from the DHCP server within the first network service provider, to the time when the CPE re-registers the replacement IP address with an IMS within the second network service provider.

During this LST period, the network service provider associated with the CPE is unable to route or resolve calls and/or Internet traffic directed to the CPE. The rejected calls and LST can be troublesome for network service providers. For example, a network service provider with 65 million customers, where each customer experiences 12 IP address changes a year, with an approximate average LST of 10 minutes for each subscriber results in a total of approximately 130 million hours of avoidable LST. The system disclosed herein significantly reduces or eliminates LST because a residential gateway is configured to notify a communicatively coupled CPE of an IP address change in response to the residential gateway receiving a replacement IP address as opposed to waiting for the CPE to register. In response to receiving the a re-authenticate message from a residential gateway, the CPE immediately re-registers with its associated VoIP network service provider using the new IP address to thereby enable the VoIP network service provider to update its records by matching the new IP address associated with the CPE to its URL.

By way of a more specific example, a DSL modem that is integrated with residential gateway and NAT functions provides a gateway to the Internet for a local consumer home network. Included within the local network is a SIP-based VoIP phone CPE that is communicatively coupled to the DSL modem using a local-area network (LAN). The DSL modem is provided access to the Internet through Service Provider A while the VoIP phone has VoIP service through Service Provider B. Service Provider A informs the DSL modem of a replacement to its IP address and updates its IP address records. In response, the DSL modem sends a SIP Notify message with the re-authenticate message to the VoIP phone. Upon receiving the SIP Notify message, the VoIP phone sends a SIP Register message to the DSL modem. The DSL modem links the replacement IP address to the private LAN IP address associated with the VoIP phone and forwards the SIP Register message including the replacement IP address to the Service Provider B. Service Provider B updates its IP address records to reflect the URL of the VoIP phone with the replaced IP address. As a result, Service Provider B continues to route and setup calls with the VoIP phone with significantly reduced and/or approximately no service disruption.

Throughout the following disclosure references are made to the example IMS based voice over IP (VoIP) networks 110 and 130 of FIG. 1. Moreover, the following disclosure will be made using session initiation protocol (SIP) message exchanges. However, the systems and methods described herein to minimize CPE downtime in a VoIP service network are applicable to other VoIP communication systems and/or networks (e.g., networks based on soft switches), VoIP devices, feature servers, border elements, access networks, residential gateways, broadband gateways, IP networks and/or other types of protocols, messages, and/or message exchanges such as, for example, media gateway control protocol (MGCP). The systems and methods being described herein are presented for a VoIP environment, but are applicable to other similar environments such as, but not limited to, various multimedia (e.g., voice, data, video, or any combinations thereof) communications. For brevity, VoIP is used herein without loss of generality or limitations.

FIG. 1A is a schematic illustration of an example communication system 100 including an example CPE 102 and an example residential gateway 104. CPEs include, but are not limited to, IMS VoIP phones, VoIP enabled personal computers (PC), VoIP endpoints, wireless VoIP devices (e.g., a wireless-fidelity (WiFi) Internet protocol (IP) phone), VoIP adapters (e.g., an analog telephone adapter (ATA)), VoIP enabled personal digital assistants (PDA), SIP CPEs, and/or VoIP kiosks. The example CPE 102 may be implemented and/or be found at any number and/or type(s) of locations. Further, the CPE 102 may be a fixed location device, a substantially fixed location device, and/or a mobile device. The example residential gateway 104 may include a VoIP residential gateway, an IP router, a multiport Ethernet switch, a cable modem, a DSL modem, a satellite modem, a firewall, and/or a wireless access point. The residential gateway 104 connects a local network with a wide area network (WAN) and/or the Internet. Additionally, the residential gateway 104 may provide a NAT function, enabling a plurality of CPEs connected to the residential gateway 104 to share one IP address. In this example, the residential gateway 104 and CPE 102 are coupled together via a communication link 103 such that the CPE 102 accesses the Internet through the residential gateway 104. The communication link 103 may be wireless and operate, for example, in accordance with the IEEE 802.11x wireless protocols. Alternatively, the communication link 103 may include a wired link such as, for example, an Ethernet connection. The residential gateway 104 and/or the CPE 102 may have additional equipment communicatively and/or electrically coupled thereto. For example, the CPE 102 may be a SIP analog telephone adapter that is coupled to an analog telephone, and/or the residential gateway 104 may be coupled to a PC and/or set-top box.

The example CPE 102 and the example residential gateway 104 may be associated with the same and/or different network service providers. In the illustrated example of FIG. 1A, the residential gateway 104 is associated with a Network Service Provider A 110 and the CPE 102 is associated with a Network Service Provider B 130. The residential gateway 104 includes an assigned dynamic IP address. The CPE 102 includes a private Local-Area Network (LAN) IP address corresponding to the LAN through which the CPE 102 is communicatively coupled to the residential gateway 104. The CPE 102 accesses the VoIP Network Service Provider B 130 through the residential gateway 104 and the Network Service Provider A 110. Communication messages and/or data transmitted from the CPE device 102 to the Internet using its private IP address are received by the residential gateway 104. The residential gateway replaces (e.g., using a NAT function) the private IP address with its WAN (e.g., the Internet) dynamic IP address and forwards the communication messages and/or data including the dynamic IP address to the Internet. The example residential gateway 104 is configured to notify the example CPE 102 of an IP address change in response to the residential gateway 104 receiving an updated or changed IP address from the Network Service Provider A 110. The example CPE 102 is configured to immediately re-register with the Network Service Provider B 130 upon receiving the re-authenticate message from the example residential gateway 104. In an alternative implementation, the example CPE 102 and the example residential gateway 104 may both subscribe to the Network Service Provider A 110. The CPE 102 and residential gateway 104 are described in further detail in FIG. 3.

The example Network Service Provider A 110 provides services to a first set of subscribers (e.g., residential gateway 104). Likewise, the example Network Service Provider B 130 provides services to a second set of subscribers (e.g., CPE 102). In general, the example Network Service Provider A 110 and Network Service Provider B 130 of FIG. 1 provide and/or enable IMS communication services and other services such as, for example, telephone services, Internet services, data services, messaging services, instant messaging services, electronic mail (email) services, chat services, video services, audio services, gaming services, voicemail, facsimile services, etc.

In the illustrated example of FIG. 1A, the Network Service Provider A 110 includes a broadband gateway 112, an session border controller 114, a peered border element 118, a DHCP server 150, an LST server 160, and an IMS core 120. The example Network Service Provider B 130 includes a broadband gateway 132, a session border controller 134, a peered border element 138, and an IMS core 140. Additionally, the Network Service Provider B 130 may include a DHCP server (not shown) and/or an LST server (not shown). The IMS cores 120 and 140 are shown in high-level forms and may contain more components that those that are shown.

The residential gateway 104 connects across a network link 105 to the broadband gateway 112 of the Network Service Provider A 110. Example network links include any type of public switched telephone network (PSTN) system(s), public land-mobile network (PLMN) system(s), wireless distribution system(s), wired or cable distribution system(s), coaxial cable distribution system(s), fiber-to-the-home network(s), fiber-to-the-curb network(s), fiber-to-the-pedestal network (s), fiber-to-the-vault network(s), fiber-to-the-neighborhood network(s), Ultra High Frequency (UHF)/Very High Frequency (VHF) radio frequency system(s), satellite or other extra-terrestrial system(s), cellular distribution system(s), power-line broadcast system(s), and/or combinations and/or hybrids of these devices, systems and/or networks.

The example broadband gateways 112 and 132 may be implemented by a wireless base station (e.g., implemented in accordance with the IEEE 802.16x and/or IEEE 802.11x families of standards), a digital subscriber line (DSL) access multiplexer (DSLAM) (e.g., implemented in accordance with the ITU-T G.992.x family of standards), and/or a cable modem termination system (CMTS) (e.g., implemented in accordance with the ITU-T J.112 and/or J.122 standards).

Additionally, the example broadband gateways 112 and 132 of FIG. 1A include routers to direct arriving packets of data and/or switches to provide paths in and out of the broadband gateways 112 and 132. The example broadband gateway 112 of the Network Service Provider A 110 connects to and communicates with the example broadband gateway 132 of the Network Service Provider B 130 through a communications network 160, which can be implemented using various technologies and may include other networks. The Network Service Provider A 110 and the Network Service Provider B 130 include a plurality of session border controllers and/or peered border elements such as, for example the respective session border controllers 114 and 134 and the respective peered border elements 118 and 138 of FIG. 1A.

The example session border controllers 114 and 134 are signaling entities functionally positioned at the edge of the respective network service provider to provide access functions for the respective IMS cores 120 and 140. For instance, because the CPE 102 subscribes to the Network Service Provider B, the communication network 160 is used by the Network Service Provider A 110 to route VoIP communications and data from the CPE 102 to the session border controller 134 of Network Service Provider B 130. The example session border controller 134 then routes the communication or data originating from the CPE 102 to the IMS core 140. Additionally, the session border controllers 114 and 134 re-address communication or data originating from the respective IMS cores 120 and 140 to the target dynamic IP addresses assigned to residential gateways. For example, the P-CSCF server 147 and/or the HSS 145 IMS core 140 include a URL address of the CPE 102. When the IMS core 140 sends the CPE 102 packet data, the communication is routed through the session border controller 134 which re-addresses the URL to the dynamic IP address assigned to the CPE 102 through the residential gateway 104 enabling the packet data to reach the CPE 102.

The example communication system 100 of FIG. 1A also includes a mated pair of peered border elements 118 and 138 to communicatively couple the IMS cores 120 and 140. The example mated pair of peered border elements 118 and 138 implement, for example, handshaking, media translation(s) and/or protocol message modification(s) to facilitate communication sessions between subscribers of the example Network Service Provider A 110 and the example Service Provider B IMS network 130. Further, while the Network Service Provider A 110 of FIG. 1 is illustrated as having a peering relationship with the Network Service Provider B 130, either or both of the Network Service Provider A 110 and the Network Service Provider B 130 may have other peering relationships with other service providers. Additionally, there may be more than one pair of peered bordered elements for any two network service providers. Such peered border elements may be connected using any one or more communication network(s) such as communication network 170, which may be a private network, a direct connection, or other communication network.

In the illustrated example of FIG. 1A, the service provider broadband gateways 112 and 132 are used to interface their corresponding subscribers to the communication network 160 and/or various network components of Network Service Providers A 110 and/or B 130, respectively. For example, a computer (not shown) communicatively coupled to broadband gateway 104 may connect to a server on the Internet (not shown) through the broadband gateway 112 and the communication network 160. In another example, the CPE 102 may register with the IMS Core 140 of Network Service Provider B through the broadband gateway 112, the communication network 160, the broadband gateway 132, and the session border controller 134.

Each of the respective IMS cores 120 and 140 facilitate, in part, VoIP communication services for the example Network Service Provider A 110 and the Network Service Provider B 130 of FIG. 1A. The example IMS Cores 120 and 140 include respective Serving Call Session Control Function (S-CSCF) servers 126 and 146, SIP registrars 122 and 142, Home Subscriber Servers (HSS) 125 and 145, Proxy-CSCF (P-CSCF) servers 117 and 147, and Interrogating-CSCF (I-CSCF) servers 129 and 149. Although only one is shown, the respective IMS cores 120 and 140 may include more than one P-CSCF server, more than one S-CSCF server, and/or more than one I-CSCF server. Additionally or alternatively, the P-SCCF servers 127 and 147 may be included within the respective session border controllers 114 and 134.

In the illustrated example of FIG. 1A, each VoIP device (e.g., the example residential gateway 104) that is registered to the example Network Service Provider A 110 is associated with and/or assigned to an S-CSCF server (i.e., S-CSCF server 126). The example S-CSCF servers 126 and 146 of FIG. 1A are responsible for handling incoming and/or outgoing IMS (e.g., VoIP) communication sessions (e.g., telephone calls, and/or data and/or video sessions) associated with their registered VoIP devices. For example, the S-CSCF server 146 within the Network Service Provider B 130 is responsible for handling the communication sessions of the CPE 102.

The example HSSs 125 and 145 store subscriber information. For example, when the CPE 102 registers with the IMS 140, the example S-CSCF server 146 places its own address in the HSS 145 so that the S-CSCF server 146 can be discovered by the example I-CSCF server 149 when a new session initiation request (e.g., a SIP INVITE) for the CPE 102 arrives at the IMS core 140. The HSS 145 may be queried by an IMS component (e.g., an I-CSCF 149) to identify the S-CSCF server (such as the S-CSCF server 146) to which the CPE 102 is registered. The S-CSCF server 146 includes a list of which particular P-CSCF server (i.e., P-CSCF server 147) needs to be used to route packets (e.g., a SIP INVITE) to the CPE 102. The list is updated using the registration request data from the CPE 102. In turn, each P-CSCF server uses the registration packet flow to determine which session border controller to use to route packets to the example CPE 102. Hence, upon registration of the CPE 102 with the IMS core 120 or 140, the particular P-CSCF server 127 or 147 (respectively) that is used to route to that CPE 102 in the respective IMS core is uniquely determined. Furthermore, the particular session border controller 114 or 134 (respectively) is also uniquely identified by the corresponding P-CSCF server 127 or 147 (respectively) during the registration procedure.

The assignment of the session border controller 114 or 134 to the CPE 102 may be dynamically determined (e.g., using the example DHCP server 150 in network service provider A 110, and another one (not shown) in network service provider B 130) using the subscriber information in the HSS 125 or 145 (respectively), the S-CSCF server 126 or 146 (respectively), and the corresponding P-CSCF server 127 or 147 (respectively). In summary, different cited IMS core components and the specific session border controller in an IMS core-CPE path are determined upon registration of the CPE 102 with either IMS core 140 or 120. The functions hereby attributed to the DHCP server 150 may be implemented using other servers or processes or any other means without loss of generality and are described in the example DHCP server 150 for convenience.

While two example S-CSCF servers 126 and 146 are illustrated in FIG. 1A, the IMS cores 120 and 140 and/or, more generally, the example Network Service Provider A 110 and the Network Service Provider B 130 may include any number and/or type(s) of S-CSCF servers, and each such S-CSCF server may support any number and/or type(s) of CPEs. The example S-CSCF servers 126 and 146 of FIG. 1 perform session control and enable communications for their associated and/or registered VoIP devices. For instance, when the example CPE 102, registered with the IMS core 140, initiates an outgoing telephone call, a communication session initiation message (e.g., a SIP INVITE message) sent by the CPE 102 is routed by the broadband gateway 112 to the Network Service Provider B 130 which routes the message to the S-CSCF server 146. The S-CSCF server 146 then routes the message to the IMS core of the called party or target network service provider.

In an example, a CPE A (not shown) is registered with the IMS core 120. The CPE A places a call (e.g., by sending a SIP INVITE packet) to the CPE 102. To locate the CPE 102, the example IMS core 120 of FIG. 1A communicates with the target I-CSCF server 149 in the IMS core 140 to locate the target S-CSCF server (e.g., the example S-CSCF server 146). The target S-CSCF server then utilizes the registration information of the CPE 102 to direct the SIP INVITE packet to the CPE 102 through the P-CSCF server 147 and the session border controller 134.

As discussed above, the Network Service Provider A 110 of FIG. 1A includes the DHCP server 150. The DHCP server 150 may be a single server or may include a plurality of servers within the Network Service Provider A 110. In the illustrated example of FIG. 1A, the DHCP server 150 administers network parameter assignments by assigning residential gateways IP addresses, subnet masks, default gateways, and/or other transmission control protocol (TCP)/IP parameters. The example DHCP server 150 assigns dynamic TCP/IP parameters. The dynamic TCP/IP parameters may be leased to a residential gateway for any period of time (e.g., a few minutes, a few hours, a few months, etc.). Additionally, the example DHCP server 150 may assign static TCP/IP parameters. Static TCP/IP parameters are permanently assigned to a residential gateway. The LST can be adversely impacted by dynamic IP address changes, and systems and methods to reduce such adverse impacts are described herein.

In the illustrated example of FIG. 1A, the DHCP server 150 provides a first IP address upon receiving an initial request from the residential gateway 104. The residential gateway 104 renews the IP address lease with the DHCP server 150 at various times. For example, the DHCP server 150 may send the residential gateway 104 a replacement IP address in response to the residential gateway 104 requesting a new IP address. Further, the example DHCP server 150 sends a replacement IP address message to the example LST server 160 and/or the session border controller 114 when the DHCP server 150 assigns a replacement IP address or reassigns the same IP address of a residential gateway. The replacement IP address message provides an indication of an IP address change including a first IP address and the replacement IP address. If the CPE 102 has already registered with IMS core 120, the LST server 160 associates the IP address change with the URL of the CPE 102, as will be shown in the following.

The example LST server 160 within the Network Service Provider 110 tracks LST and failed network transactions associated with changing the IP address of a residential gateway. The example LST server 160 receives a notification message from the DHCP server 150 of an IP address change, creates a database entry for the subscriber associated with the IP address change, stores registration notifications (which includes the URL of the CPE 102) from session border controller 114 and/or the IMS core 120, receives indications of failed network transactions from the IMS core 120 and/or the session border controller 114, monitors network traffic for failed network transactions, and/or determines whether a network transaction is a failed network transaction associated with the IP address change. If the network transaction is a failed network transaction due to, for example, the IP address change, then the LST server 160 stores the failed network transaction(s). Alternatively, the LST server 160 may store an indication of the failed network transaction(s). The LST server 160 records the URL of the CPE 102 and associates that URL with the IP address of the residential gateway 104 upon the CPE 102 registering with an IMS core (e.g., the IMS core 120). Furthermore, the associated session border controller (e.g., session border controller 134) records the mapping between the URL of the CPE 102 and the IP address of the residential gateway 104 upon registration of the CPE 102. To illustrate, when the DHCP server 150 sends the residential gateway 104 a replacement IP address to replace a first IP address, the example DHCP server 150 will also send a replacement IP address message to the LST server 160. The LST server 160 which creates a database entry to record the time, the replacement IP addresses, and/or the first IP address associated with the residential gateway. Additionally, the example LST server 160 monitors network traffic from the IMS core 120 for failed network transactions relating to the IP address of the CPE 102 that is addressed using the IP address of the residential gateway 104. In the event that the LST server 160 detects a failed network transaction such as, for example, a rejected call (e.g., an unsuccessful delivery of a SIP INVITE message intended for and addressed to the URL of the CPE 102), then the LST server 160 stores the failed network transaction and/or an indication of the failed network transaction in the database entry associated to the CPE 102 of the residential gateway 104. The associated network service provider may access and analyze a plurality of database entries to determine if an IP address change was a cause for loss of service in certain instances. As described in further detail below, the example LST server 160 may be used to generate reports of the total LST and/or associated failed network transactions to respond to inquiries by customers, businesses, government agencies, etc. Also, the network service provider may use the data to configure and/or design improvements to session border controllers, IMS cores, DHCP servers, CPEs, and/or communications between one or more entities to improve LST and/or the associated failed network transactions.

While the example Network Service Provider A 110 has been illustrated in FIG. 1A, the devices, networks, systems, servers and/or processors illustrated in FIG. 1A may be combined, divided, re-arranged, eliminated and/or implemented in any way. For example, the example broadband gateway 112, the example session border controller 114, the example peered border element 118, the example DHCP server 150, the example IMS core 120, the example SIP registrar server 122, the example S-CSCF server 126, the example P-CSCF server 127, the example I-CSCF server 129, the example HSS 125, and/or the example LST server 160 illustrated in FIG. 1A may be implemented separately and/or in any combination using, for example, machine accessible instructions executed by one or more computing devices and/or computing platforms (e.g., the example processing platform 1000 of FIG. 10). Further, the example broadband gateway 112, the example session border controller 114, the example peered border element 118, the example DHCP server 150, the example IMS core 120, the example SIP registrar server 122, the example S-CSCF server 126, the example P-CSCF server 127, the example I-CSCF server 129, the example HSS 125, the example LST server 160, and/or, more generally, the Network Service Provider A 110 may be implemented by hardware, software, firmware and/or any combination of hardware, software and/or firmware. Thus, for example, any of the example broadband gateway 112, the example session border controller 114, the example peered border element 118, the example DHCP server 150, the example IMS core 120, the example SIP registrar server 122, the example S-CSCF server 126, the example P-CSCF server 127, the example I-CSCF server 129, the example HSS 125, the example LST server 160, and/or, more generally, the example Network Service Provider A 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example broadband gateway 112, the example session border controller 114, the example peered border element 118, the example DHCP server 150, the example IMS core 120, the example SIP registrar server 122, the example S-CSCF server 126, the example P-CSCF server 127, the example I-CSCF server 129, the example HSS 125, the example LST server 160, and/or the example Network Service Provider A 110 are hereby expressly defined to include a tangible medium such as a memory, DVD, CD, etc. storing such software or firmware. Further still, the example Network Service Provider A 110 may include additional devices, servers, systems, networks, gateways, portals, and/or processors in addition to, or instead of, those illustrated in FIG. 1A and/or may include more than one of any or all of the illustrated devices, servers, networks, systems, gateways, portals, and/or processors. For example, the IMS core 120 may include one or more of a proxy CSCF (P-CSCF) server, an interrogating CSCF (I-CSCF) server, a feature server, an application server, a home subscriber server (HSS), a media gateway, a breakout gateway control function (BGCF) sever, a media gateway control function (MGCF) server, a softswitch, an IP router, an IP switch, etc.

Likewise, while the example Network Service Provider B 130 has been illustrated in FIG. 1A, the devices, networks, systems, servers and/or processors illustrated in FIG. 1A may be combined, divided, re-arranged, eliminated and/or implemented in any way. For instance, the example broadband gateway 132, the example session border controller 134, the example peered border element 138, the example IMS core 140, the example SIP registrar server 142, the example S-CSCF server 146, the example I-CSCF server 149, the example HSS 145, and/or the example P-CSCF server 147 illustrated in FIG. 1A may be implemented separately and/or in any combination using, for example, machine accessible instructions executed by one or more computing devices and/or computing platforms (e.g., the example processing platform 1000 of FIG. 10). Further, the example broadband gateway 132, the example peered border element 138, the example session border controller 134, the example IMS core 140, the example SIP registrar server 142, the example S-CSCF server 146, the example I-CSCF server 149, the example HSS 145, the example P-CSCF server 147 and/or, more generally, the Network Service Provider B 130 may be implemented by hardware, software, firmware and/or any combination of hardware, software and/or firmware. Thus, for example, any of the example broadband gateway 132, the example peered border element 138, the example session border controller 134, the example IMS core 140, the example SIP registrar server 142, the example S-CSCF server 146, the example I-CSCF server 149, the example HSS 145, the example P-CSCF server 147 and/or, more generally, the example Network Service Provider B 130 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation or firmware, at least one of the example broadband gateway 132, the example peered border element 138, the example session border controller 134, the example IMS core 140, the example SIP registrar server 142, the example I-CSCF 149, the example S-CSCF server 146, the example HSS 145, the example P-CSCF server 147 and/or the example Network Service Provider B 130 are hereby expressly defined to include a tangible medium such as a memory, DVD, CD, etc. storing such software or firmware. Further still, the example Network Service Provider B 130 may include additional devices, servers, systems, networks, gateways, portals, and/or processors in addition to, or instead of, those illustrated in FIG. 1A and/or may include more than one of any or all of the illustrated devices, servers, networks, systems, gateways, portals, and/or processors.

Figure 1B:
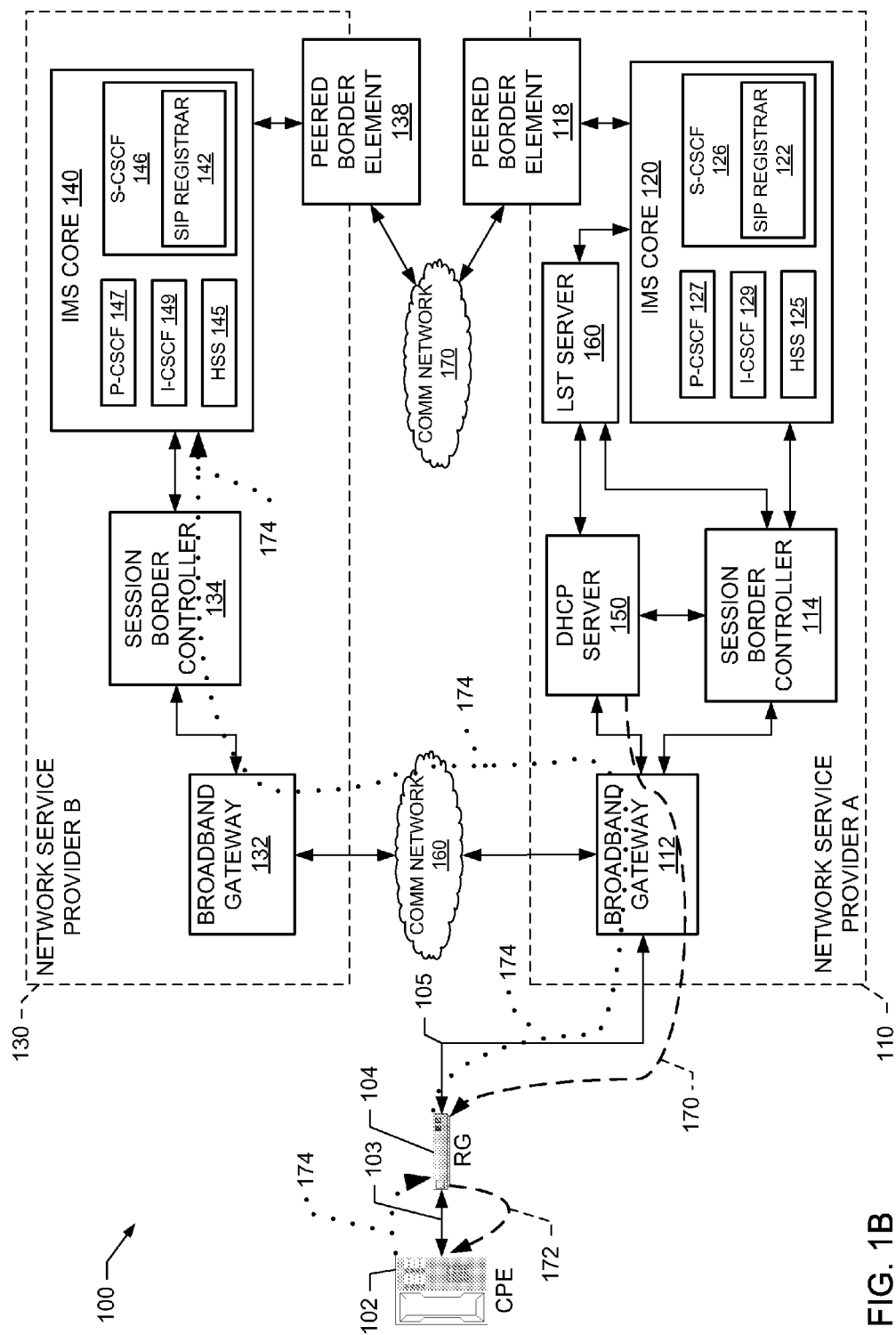
FIG. 1B is a schematic illustration of the example communication system of FIG. 1A showing the communication paths for an IP address update.

FIG. 1B is a schematic illustration of the example communication system 100 of FIG. 1A showing the communication paths for an IP address change. In the illustrated example of FIG. 1B, the example residential gateway 104 initiates an IP address update by requesting a replacement IP address to replace a first IP address from the DHCP server 150 (not shown). In response, the example DHCP server 150 sends the residential gateway 104 a replacement IP address in the message 170.

In the example of FIG. 1B, once the residential gateway 104 receives the replacement IP address, a re-authenticate message 172 is sent (e.g., via a SIP Notify message) to the CPE 102 via the communication link 103. The CPE 102 receives the re-authenticate message 172 from the residential gateway 104 and immediately registers with the IMS core 140 of the Network Service Provider B 130. The re-authenticate message 172 triggers a high priority function within the CPE 102 to initiate immediate registration. The CPE 102 registers by sending a register message 174 to the residential gateway 104 via the communication link 103. The register message 174 may include, for example, a SIP Register message. The residential gateway receives the register message 174, replaces the private IP address of the CPE 102 in the register message 174 with the replacement IP address that was assigned by the example DHCP server 150 and forwards the register message 174 to the IMS core 140. Additionally, the residential gateway 104 re-addresses (e.g., links) the private IP address of the CPE 102 to the replacement IP address within the residential gateway 104. The residential gateway transmits the register message 174 to the IMS core 140 be sending the register message 174 to the broadband gateway 112 via the network link 105. The broadband gateway 112 determines the register message 174 is addressed to the Network Service Provider B 130 and sends the register message 174 through the communication network 160, through the broadband gateway 132, through session border controller 134 to the SIP registrar 142 in IMS core 140. Upon successful exchange of information between the CPE 102 and the SIP registrar 142, CPE 102 is registered with IMS core 140. Additionally, the session border controller 134 updates its internal mapping of the URL of the CPE 102 from the first IP address to the replacement IP address. At this point, a URL to IP address mapping is established and the CPE 102 may receive calls. In the network scenarios and configurations that are described herein, there is no need for the session border controller 134 to consult a Domain Name System (DNS) server to map a URL to a dynamic IP address of a residential gateway, but such a possibility is not precluded.

Unlike current CPEs and/or residential gateways that typically take a time period (e.g., a few minutes to a few hours) to re-register with their associated network service provider, the systems and methods described herein minimize and/or eliminate instances of loss of service by re-registering with the associated network service provider in response to the example residential gateway receiving a replacement IP address to replace a first IP address.

In other example circumstances, the CPE 102 may subscribe to the residential gateway 104 at some time before the residential gateway 104 receives a replacement IP address. The subscribe message from the CPE 102 may include, for example, a SIP Subscribe message. By subscribing to the residential gateway 104 the CPE 102 informs the residential gateway 104 to send the CPE 102 a re-authenticate message when the residential gateway 104 receives a replacement IP address.

Figure 2:
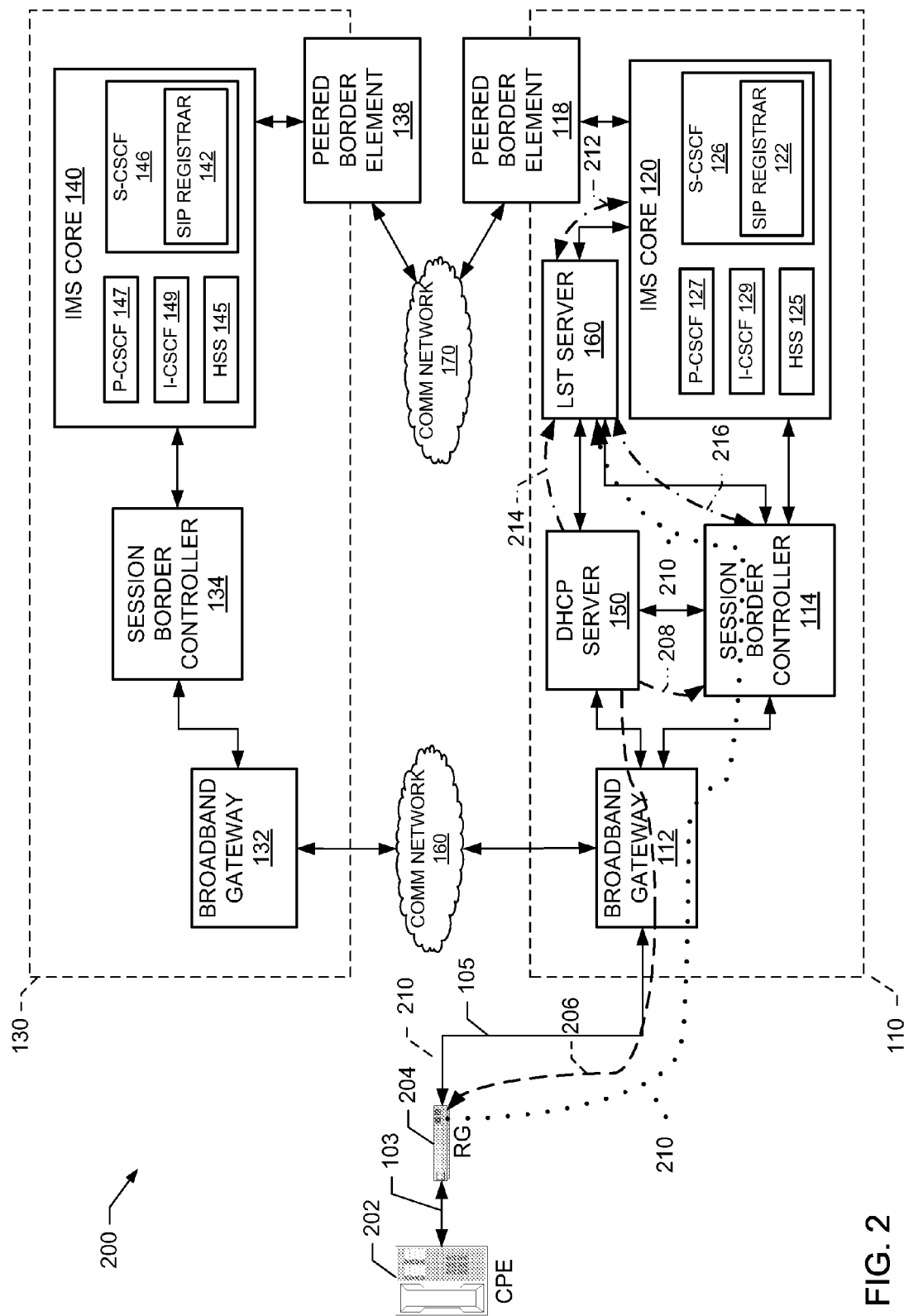
FIG. 2 is a schematic illustration of an example communication system showing the communication paths for an IP address change and the corresponding LST monitoring of the IP address change.

FIG. 2 is a schematic illustration of an example communication system 200 displaying the communication paths for an IP address change and the corresponding LST monitoring of the IP address change. The example communication system 200 of FIG. 2 includes the Network Service Provider A 110, and the Network Service Provider B 130 of FIGS. 1A and 1B, a residential gateway 204, and a CPE 202. Unlike the example residential gateway 104 of FIGS. 1A and 1B, the residential gateway 204 of FIG. 2 is not configured to notify a CPE of an IP address change in response to receiving an IP address. As a result, a time period elapses between the residential gateway 204 receiving an IP address and the CPE 202 registering with its IMS core. Additionally, in the illustrated example of FIG. 2, the CPE 202 does not send a register message to its associated network service provider in response to the residential gateway 204 receiving a replacement IP address. This results in a time period between the residential gateway 204 receiving the replacement IP address and when the CPE 202 sends a registration message to the associated network service provider. The residential gateway 204 is configured to send an indication of the IP address change to the LST server 160 upon receiving a replacement IP address. Additionally, in the illustrated example of FIG. 2, the residential gateway 204 and the CPE 202 both subscribe to and/or are associated with the same Network Service Provider A 110. The example DHCP server 150 of FIG. 2 is configured to send a replacement IP address message to the example LST server 160 and/or the session border controller 114 upon assigning a replacement IP address to the residential gateway 204.

In the example of FIG. 2, an IP address change initiates when the example DHCP server 150 assigns the residential gateway 204 a replacement IP address. Assigning the replacement IP address may be in response to, for example, the DHCP server 150 receiving a request from the residential gateway 204 for an IP address and/or a request to renew the license on its current IP address. The DHCP server 150 assigns the residential gateway 204 the replacement IP address via a message 206. In response, the example residential gateway 204 sends a replacement IP address message 210 to the LST server 160. Additionally, the example DHCP server 150 sends a replacement IP address message 214 to the LST server 160 and a replacement IP address message 208 to the session border controller 114. Upon receiving at least one of the replacement IP address messages 210 or 214, the LST server 160 creates a database entry for the associated residential gateway 204 and CPE 202. The replacement IP address messages 210, 214, and 208 may include the replacement IP address and a first IP address replaced by the replacement IP address. The session border controller 114 receives the replacement IP address message 208 and the updates the IP address-URL mapping for the CPE device 202 with the replacement IP address replacing the first IP address. LST is reduced by the example DHCP server 150 sending the session border controller 114 the replacement IP address before the CPE 204 registers with the IMS core 120.

During the time period between the residential gateway 204 receiving the replacement IP address and the CPE 204 registering with the IMS core 120, the example LST server 160 monitors network traffic transmitted to and received from the IMS core 120 and/or session border controller 114 for CPE 202. The monitoring is represented schematically in FIG. 2 by arrows 212 and 216, respectively. In the illustrated example of FIG. 2, the LST server 160 monitors for failed network transactions as a result of the IP address change. For example, if a consumer in a Network Service Provider B 130 attempts to call the CPE 202, whose residential gateway 204 just received the replacement IP address, the call initiation request (e.g., SIP INVITE messages) may be routed through the communication network 160 or through peered border elements 118 and 138 using the communication network 170 to the IMS core 120. The I-CSCF server 129 in the IMS core 120 would identify the S-CSCF server 126 as the server associated with the CPE 202 and the SIP INVITE message would be sent to the example P-CSCF server 127 associated with the CPE 202. The example P-CSCF server 127 would then route the SIP INVITE message to the example session border controller 114 associated with the CPE 202. If the session border controller 114 has the current and correct (i.e., the replacement) IP address of the residential gateway 204, it successfully sends the SIP INVITE message to the CPE 202 through the broadband gateway 112 and the residential gateway 204. Upon acceptance of the call request by the CPE 202, a 200 OK SIP response message would be sent by the CPE 202, and such message would traverse back to the originating calling CPE (not shown) through the residential gateway 204, the broadband gateway 112, the session border controller 114, the S-CSCF server 126 and such devices that were used to send the original SIP INVITE message. However, if the session border controller 114 does not have the replacement IP address for residential gateway 204, it cannot successfully send the SIP INVITE message to the CPE 202. The response to the failed SIP INVITE message would be sent back to the IMS core 120. The session border controller 114 and/or the IMS core 120 records such failure in the LST Server 160. The example LST server 160 detects the failed network transaction (e.g., by detecting the failed network transaction message) and determines it is a result of the IP address change to the CPE 202. The LST server 160 then saves the failed network transaction to the database entry within the LST server 160 created for the replacement IP address change for the CPE 202.

When the CPE 202 registers with its IMS core (e.g., the example IMS core 120), the IP address of the residential gateway 204 associated with the CPE is updated in the session border controller of the corresponding service provider (e.g., session border controller 114). The LST server 160 can discover that residential gateway 204 of CPE 202 has just received a replacement IP address and that SIP INVITE and other messages can be routed to it. Additionally, the LST server 160 can be informed of such a change using one or more other mechanisms such as: a) a message 214 from DHCP server 150, b) a message 216 from session border controller 114, c) a message 212 from IMS core 120, and/or any combinations thereof.

Figure 3:
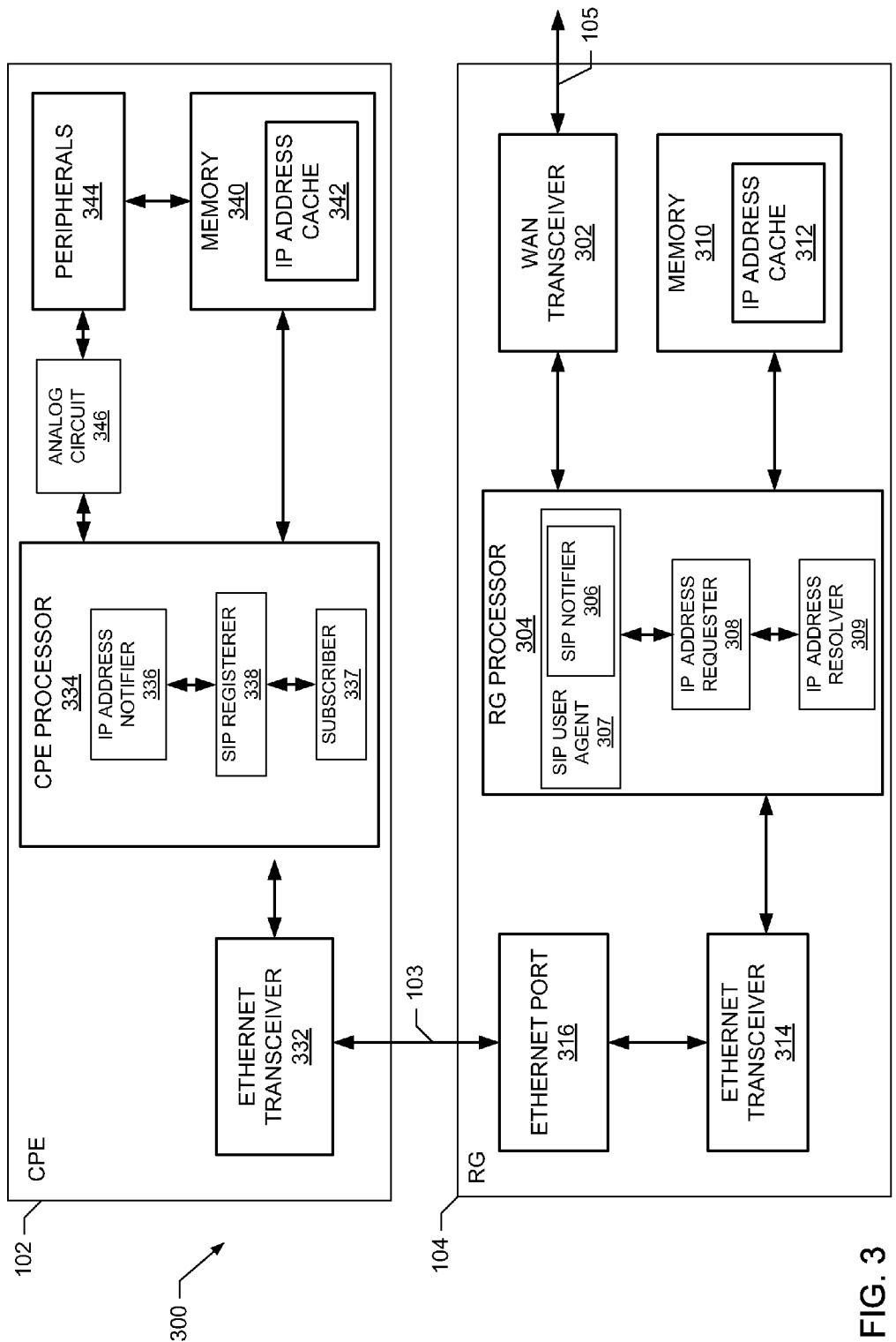
FIG. 3 is a block diagram of the example CPE and the residential gateway of FIGS. 1A and 1B.

FIG. 3 is a block diagram of the example CPE 102 and the residential gateway 104 of FIGS. 1A and 1B. The example residential gateway 104 of FIG. 3 illustrates an example manner of implementing any or all residential gateways. The residential gateway 104 may include a VoIP residential gateway, an IP router, a multiport Ethernet switch, a cable modem, a DSL modem, a satellite modem, a firewall, and/or a wireless access point. The residential gateway 104 connects a LAN with a WAN (e.g., the Internet) and provides NAT functionality, which enables a plurality of CPEs connected to the residential gateway 104 to share one IP address. The residential gateway 104 may interconnect one or more associated personal computers with each other and/or with other CPEs within the local network including a connection to one or more televisions, VoIP phones, displays, wireless interfaces, and/or voice processing. The example residential gateway 104 of FIG. 3 includes a WAN transceiver 302, an RG processor 304, a memory 310, an Ethernet transceiver 314, and an Ethernet port 316. To handle processing functions, the example residential gateway 104 includes any number and/or type(s) of RG processors 304. The example RG processor 304 of FIG. 3 implements, among other things, a WAN connection (WANC) and/or an Internet connection, session control, Ethernet protocols, a SIP user agent 307, network address translation, a packetizer to packetize encoded data and a de-packetizer to de-packetize encoded data. The SIP user agent within the example RG processor 304 includes a SIP notifier 306, an IP address requester 308, and an IP address resolver 308.

In addition to any number and/or type(s) of specialized hardware, firmware and/or logic to perform processing functions, the example RG processor 304 of FIG. 3 includes any number and/or type(s) of specialized and/or general purpose controller(s) and/or processing unit(s) capable of executing coded instructions. For example, the controller and/or processing unit may perform any number and/or type(s) of processing functions by carrying out and/or executing coded instructions present in a memory 310 communicatively coupled and/or within the RG processor 304 (e.g., within a random-access memory (RAM), a read-only memory (ROM) and/or on-board memory of the RG processor 304).

The example RG processor 304 communicates with the memory 310 (including a read-only memory (ROM) and/or the RAM) and/or other devices and/or modules of the example residential gateway 104 of FIG. 3 via any type(s) and/or number of buses. The RAM may be implemented by, for example, dynamic random-access memory (DRAM), synchronous dynamic random-access memory (SDRAM), and/or any other type of RAM device(s). The ROM may be implemented by, for example, flash memory(-ies) and/or any other desired type of memory device(s). Access to the memory 310 may be controlled by a memory controller (not shown). Additionally or alternatively, the example RAM and/or example ROM may be used to store data received by and/or transmitted by the example residential gateway 104. The RAM and/or ROM 310 includes an IP address cache 312 to store a replacement dynamic IP address sent to the residential gateway 104 from the corresponding network service provider, the private LAN IP address associated with the CPE 102, and/or a mapping of the dynamic IP address assigned to the residential gateway 104 to the private LAN IP address.

The example RG processor 304 enables a CPE such as the example CPE 102 to subscribe to the example residential gateway 104. The example CPE 102 subscribes to the residential gateway 104 upon activation of the CPE 104 and/or subsequently at periodic intervals by sending a subscriber message. The subscribe message transmitted to the residential gateway 104 may include, for example, a SIP Subscribe message. Subscribing to the residential gateway 104 informs the residential gateway 104 to send the CPE 102 a re-authenticate message when a replacement IP address is assigned to the residential gateway 104. Thus, when the residential gateway 104 receives a replacement IP address, the residential gateway 104 sends a re-authenticate message to the CPEs that have subscribed, including the CPE 102. Upon receiving the re-authenticate message, the CPE 102 registers with the Network Service Provider B 130 of FIGS. 1A and 1B.

The example IP address requester 308 is configured to monitor for replacement IP address messages and transactions from the corresponding network service provider (e.g., the Network Service Provider A 110). Additionally, the IP address requester 308 sends DHCP request messages to the DHCP server 150 within the corresponding network service provider. The DHCP request messages may include a request to renew the IP address license associated with the residential gateway 104 and/or a request (i.e., a DHCP Request message) for a new IP address. As discussed above, the DHCP server 150 may respond to either type of request with an IP address license renewal response or a new IP address response (i.e., a DHCP Response message). Upon receiving a replacement IP address from the DHCP server 150, the example IP address requester 308 executes a high priority function by transmitting a signal to the SIP notifier 306. In response to the signal, the example SIP notifier 306 transmits a re-authenticate message to communicatively coupled CPEs including the example CPE 102. The re-authenticate message may include, for example, a SIP Notify message. The example SIP notifier 306 may transmit a re-authenticate message to CPEs that have subscribed to the residential gateway 104 or alternatively, to all of the CPEs communicatively coupled to the residential gateway 104. Additionally, the example SIP notifier 306 may send a replacement IP address message to the LST server 160 of FIG. 3.

The example IP address resolver 309 is configured to link the private LAN IP address associated with the CPE 102 to the dynamic IP address assigned to the residential gateway 104. The IP address resolver 309 updates the WAN IP address with the replacement IP address upon the CPE 102 registering with the Network Service Provider B 130. Additionally, the IP address resolver 309 provides NAT for CPEs communicating with sources on the Internet. For example, when the residential gateway 104 receives a replacement IP address to replace a first IP address, the residential gateway 104 stores the replacement IP address in place of the first IP address in the IP address cache 312. At this point the private IP address of the CPE 102 is not linked to the replacement IP address. When the CPE 102 registers with the Network Service Provider B 130, the CPE 102 sends a register message including its private LAN IP address to the IP address resolver 309. The IP address resolver 309 links (e.g., re-addresses) the private LAN IP address to the replacement IP address in the IP address cache 312 and replaces the private LAN IP address within the register message with the replacement IP address (i.e., NAT). The IP address resolver 309 then forwards the register message with the replacement IP address to the Network Service Provider B 130.

In the illustrated example of FIG. 3, the residential gateway 104 includes the WAN transceiver 302 to transmit and receive information with the corresponding network service provider via the network link 105 of FIGS. 1A, 1B, and 2. The network link 105 may include a fiber optic communication system implementing Fiber to the Home or Fiber to the Node (e.g., such as AT&T's Project Lightspeed™), a digital subscriber line (DSL) communication system (e.g., such as a DSL system implemented using asymmetric DSL (ADSL), very high data rate DSL (VDSL), etc.), a cable television communication system, a satellite communication system, a microwave communication system, a mobile telephone communication system, a public switched telephone (PSTN) communication system, etc. The WAN transceiver 302 includes circuits for converting digital signals to and from signals suitable for transmission across the network link 105. The WAN transceiver 302 may be compatible with SIP, MGCP and/or any past, present, or future protocols. Additionally, the WAN transceiver 302 may multiplex data packets from CPEs for transmission to the network service provider, and/or de-multiplex received data into data packets for the corresponding CPE 102.

The example Ethernet port 316 of FIG. 3 includes a plurality of ports providing connectivity to CPEs, including the CPE 102. The residential gateway 104 may include additional ports such as, for example, a PCI interface, a Firewire interface, a USB interface, a DB25 interface, etc. Additionally, the port could include a wireless link utilizing, for example, the IEEE 802.11x wireless protocol. In the example of FIG. 3, the CPE 102 connects to the residential gateway 104 via a wired Ethernet connection to the Ethernet port 316 of the residential gateway 104.

The example Ethernet transceiver 314 of FIG. 3 is used to communicatively couple the residential gateway 104 to the CPE 102 of FIG. 3 via a LAN. The LAN may be a twisted pair of wires as specified by IEEE 802.3 protocol and/or a wireless connection as specified by the IEEE 802.11 protocol. The Ethernet transceiver 314 sends and receives data packets from the communicatively coupled CPE 102. The Ethernet is used as an example of a LAN implementation, but other subscriber networking technologies may also be used.

The example CPE 102 of FIG. 3 illustrates an example manner of implementing any or all VoIP devices. To handle VoIP processing functions, the example CPE 102 includes any number and/or type(s) of CPE processors 334, which may facilitate among other things, session control, VoIP protocols, a SIP user agent, and a coder to encode audio and/or video signals, a decoder to decode received audio and/or video signals, a packetizer to packetize encoded data and/or a de-packetizer to de-packetize encoded data. The example CPE processor 334 includes an IP address notifier 336 and a SIP registerer 338.

Additionally, the example CPE processor 334 includes a subscriber 337 to subscribe to the residential gateway 104. The subscriber 337 subscribes upon activation of the CPE 104 and subsequently confirms the subscription at various intervals. The subscribe message transmitted to the residential gateway 104 by the subscriber 337 may include, for example, a SIP Subscribe message. Subscribing to the residential gateway 104 informs the residential gateway 104 to send the CPE 102 a re-authenticate message when a replacement IP address is assigned to the residential gateway 104. Thus, when the residential gateway 104 receives a replacement IP address, the residential gateway 104 sends a re-authenticate message to the CPE 102 to register. Upon receiving the re-authenticate message, the CPE 102 registers by sending a register message (e.g., a SIP REGISTER message) to the VoIP network service provider through the residential gateway 104. The residential gateway 104 replaces the private LAN IP address in the register message from the CPE 102 with the replacement IP address and forwards the register message with the replacement IP address to the VoIP network service provider associated with the CPE 102.

The example IP address notifier 336 of FIG. 3 is configured to monitor messages and transactions from the residential gateway 104 for a re-authenticate message or notifications to register. A re-authenticate message may include, for example, a SIP Notify message from the residential gateway 104. The IP address notifier 336 implements a high priority function by transmitting a high priority message to the SIP registerer 338 that a re-authenticate and/or IP address change message has been received. The high priority message may be an interrupt message and/or physical voltage used to initiate registration. Immediately upon receiving the high priority message from the example IP address notifier 336, the SIP registerer 338 sends a register message to the corresponding VoIP CPE network service provider. In the example of FIG. 1B, the SIP registerer 338 sends a register message to the example Network Service Provider B 130. The register message may include, for example, a SIP Register message including the IP address for the CPE 102.

In addition to any number and/or type(s) of specialized hardware, firmware and/or logic to perform VoIP processing functions, the example CPE processor 334 of FIG. 3 may include any number and/or type(s) of specialized and/or general purpose controller(s) and/or processing unit(s) capable of executing coded instructions. For example, the controller and/or processing unit may perform any number and/or type (s) of VoIP processing functions by carrying out and/or executing coded instructions present in a main memory 340 communicatively coupled to and/or within the CPE processor 334 (e.g., within a random-access memory (RAM), a read-only memory (ROM) and/or on-board memory of the CPE processor 334).

The example CPE processor 334 is in communication with the memory 340 (including a read-only memory (ROM) and/or the RAM) and other devices and/or modules of the example CPE 102 of FIG. 3 via any type(s) and/or number of buses. The RAM may be implemented by, for example, dynamic random-access memory (DRAM), synchronous dynamic random-access memory (SDRAM), and/or any other type of RAM device(s). The ROM is implemented by, for example, flash memory(-ies) and/or any other desired type of memory device(s). Access to the example memory 340 may be controlled by a memory controller (not shown). Additionally or alternatively, the example RAM and/or example ROM may be used to store data received by and/or transmitted by the example CPE 102 via a data communication session operated substantially in parallel to a VoIP communication session and/or via the VoIP communication session. The phrase "substantially in parallel," indicates that the primary communication session operates during a time interval that at least partially overlaps with a second time interval during which the data communication session takes place. The data stored by the RAM and/or ROM includes the private IP address of the CPE 102. The private IP address may be stored in an IP address cache 342 that is part of the RAM and/or ROM.

The example CPE 102 includes peripherals 344 such as, for example, a handset, an input device, and a display. To electrically couple signals (e.g., speech signals) between the peripherals 344 and the example CPE processor 334, the example CPE 102 includes any number and/or type(s) of analog circuits 346. An example analog circuit 346 includes any number and/or type(s) of filter(s), analog-to-digital converter(s) and/or digital-to-analog converter(s) to convert between analog signals sent to and/or received from a handset and digital signals sent to and/or received from the example CPE processor 334. The handset can be corded or cordless. If a cordless handset is employed, the analog circuit is implemented with any number and/or type(s) of wireless communication technologies to communicatively couple the example CPE processor 334 with any type of cordless handset. Moreover, the example analog circuit may, additionally or alternatively, implement any number and/or type(s) of subscriber line interface circuits (SLICs) that allow any number and/or type(s) of corded and/or cordless PSTN-based telephones to be electrically coupled to the example CPE processor 334. The latter example could be used, for instance, in implementations where the example CPE 102 is located in and/or implements a VoIP analog telephone adapter (ATA).

To facilitate user inputs via any type of input device (e.g., a keypad, a keyboard and/or a touch screen), the example CPE 102 of FIG. 3 includes any type of peripherals 344. For example, the peripherals 344 may electrically couple and/or translate electrical signals conveying key and/or button press information from the input device to the example CPE processor 334. The peripherals 344 may be used by a user to initiate and/or establish a parallel and/or secondary data communication session that may be used by, for example, the CPE processor 334 and/or any application implemented by and/or within the example CPE to send data to a network service provider (e.g., Network Service Provider B of FIG. 1A).

To provide output information to a user via any number and/or type(s) of displays, the peripherals 344 within the example CPE 102 of FIG. 3 includes any number and/or type(s) of display interfaces. An example display interface receives information (e.g., alphanumeric characters) to be displayed from the example CPE processor 334 and creates electrical signals suitable for displaying the information on the display. The display interface and/or the display may also be used to, for example, display pictures, text (e.g., alphanumeric characters) and/or video received by the example CPE 102 via a parallel and/or secondary data communication session.

The example Ethernet transceiver 332 of FIG. 3 is used to communicatively couple the example CPE 102 to the example residential gateway 104 of FIG. 3 via a local-area network (LAN). The LAN may be a twisted pair of wires as specified by IEEE 802.3 protocol and/or a wireless connection as specified by the IEEE 802.11 protocol. The Ethernet transceiver 332 sends and receives data packets from the communicatively coupled residential While the example residential gateway 104 has been illustrated in FIG. 3, the devices, networks, systems, servers and/or processors illustrated in FIG. 3 may be combined, divided, re-arranged, eliminated and/or implemented in any way. For example, the example WAN transceiver 302, the example RG processor 304, the example SIP notifier 306, the example IP address requester 308, the example IP address resolver 308, the example memory 310, the example IP address cache 312, the example Ethernet transceiver 314, and/or the example Ethernet port 316 illustrated in FIG. 3 may be implemented separately and/or in any combination using, for example, machine accessible instructions executed by one or more computing devices and/or computing platforms (e.g., the example processing platform 1000 of FIG. 10). Further, the example WAN transceiver 302, the example RG processor 304, the example SIP notifier 306, the example IP address requester 308, the example IP address resolver 308, the example memory 310, the example IP address cache 312, the example Ethernet transceiver 314, the example Ethernet port 316, and/or, more generally, the example residential gateway 104 may be implemented by hardware, software, firmware and/or any combination of hardware, software and/or firmware. Thus, for example, any of the example WAN transceiver 302, the example RG processor 304, the example SIP notifier 306, the example IP address requester 308, the example IP address resolver 308, the example memory 310, the example IP address cache 312, the example Ethernet transceiver 314, the example Ethernet port 316, and/or, more generally, the example residential gateway 104 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example WAN transceiver 302, the example RG processor 304, the example SIP notifier 306, the example IP address requester 308, the example IP address resolver 308, the example memory 310, the example IP address cache 312, the example Ethernet transceiver 314, the example Ethernet port 316, and/or the example residential gateway 104 are hereby expressly defined to include a tangible medium such as a memory, DVD, CD, etc. storing such software or firmware. Further still, the example residential gateway 104 may include additional devices, servers, systems, networks, gateways, portals, and/or processors in addition to, or instead of, those illustrated in FIG. 3 and/or may include more than one of any or all of the illustrated devices, servers, networks, systems, gateways, portals, and/or processors.

Likewise, while the example CPE 102 has been illustrated in FIG. 3, the devices, networks, systems, servers and/or processors illustrated in FIG. 3 may be combined, divided, re-arranged, eliminated and/or implemented in any way. For instance, the example Ethernet transceiver 332, the example CPE processor 334, the example IP address notifier 336, the SIP registerer 338, the example subscriber 337, the example memory 340, the example IP address cache 342, the example peripherals 344, and/or the example analog circuit 346 illustrated in FIG. 3 may be implemented separately and/or in any combination using, for example, machine accessible instructions executed by one or more computing devices and/or computing platforms (e.g., the example processing platform 1000 of FIG. 10). Further, the example Ethernet transceiver 332, the example CPE processor 334, the example IP address notifier 336, the SIP registerer 338, the example subscriber 337, the example memory 340, the example IP address cache 342, the example peripherals 344, the example analog circuit 346 and/or, more generally, the CPE 102 may be implemented by hardware, software, firmware and/or any combination of hardware, software and/or firmware. Thus, for example, any of the example Ethernet transceiver 332, the example CPE processor 334, the example IP address notifier 336, the SIP registerer 338, the example subscriber 337, the example memory 340, the example IP address cache 342, the example peripherals 344, the example analog circuit 346 and/or, more generally, the example CPE 130 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation or firmware, at least one of the example the example Ethernet transceiver 332, the example CPE processor 334, the example IP address notifier 336, the SIP registerer 338, the example subscriber 337, the example memory 340, the example IP address cache 342, the example peripherals 344, the example analog circuit 346, and/or the example CPE 102 are hereby expressly defined to include a tangible medium such as a memory, DVD, CD, etc. storing such software or firmware. Further still, the example CPE 102 may include additional devices, servers, systems, networks, gateways, portals, and/or processors in addition to, or instead of, those illustrated in FIG. 3 and/or may include more than one of any or all of the illustrated devices, servers, networks, systems, gateways, portals, and/or processors.

Figure 4A:
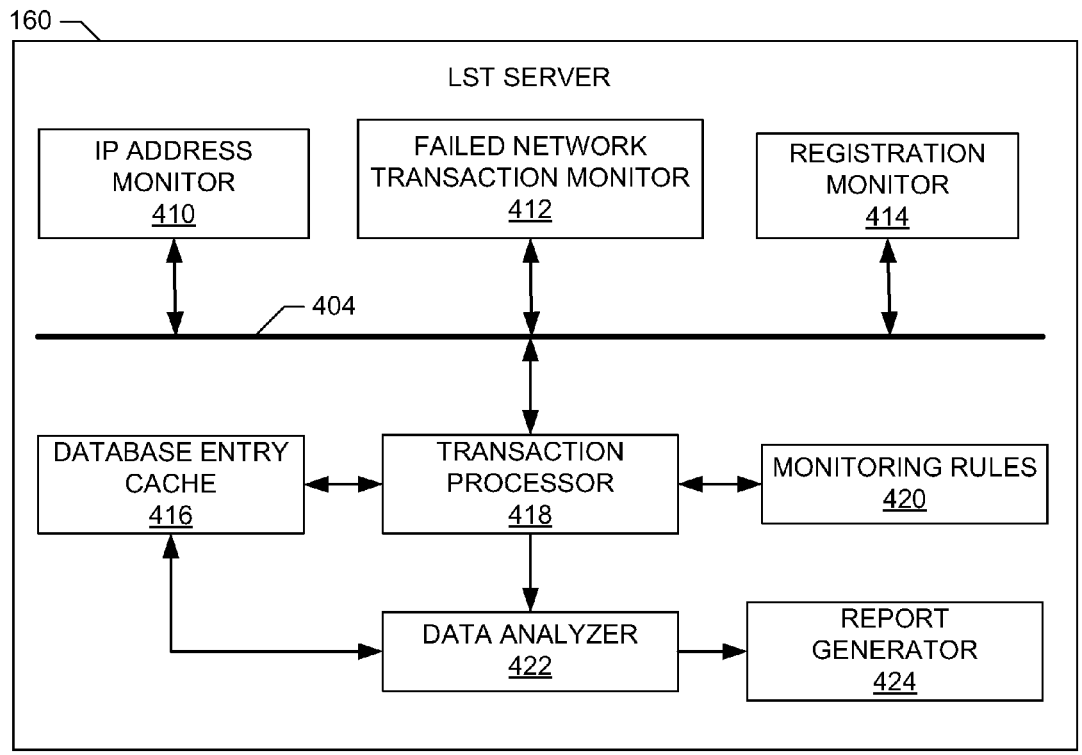
FIG. 4A is a block diagram of the example LST server of FIGS. 1A, 1B, and 2.

FIG. 4A is a block diagram of the example LST server 160 of FIGS. 1A, 1B, and/or 2. The example LST server 160 includes a bus 404 that communicatively couples an IP address monitor 410, a failed transaction monitor 412, a registration monitor 414, and a transaction processor 418. The bus 404 may include any number and/or type(s) of buses, connections, jumpers, etc. The example LST server 160 is part of a network service provider such as, for example, the Network Service Provider A 110 of FIGS. 1A, 1B, and/or 2. The LST server 160 tracks LST and failed network transactions associated with changing IP addresses of residential gateway(s). Additionally to provide network performance data, the example LST server 160 analyzes the failed network transactions to confirm IP address change(s) were the cause for a loss of service experienced by subscribing consumer(s) and to generate reports to respond to inquiries regarding network performance, LST, and/or loss of service. The network service provider may use the reports to design improvements to the network to reduce and/or eliminate instances of service loss and the corresponding LST.

In the illustrated example of FIG. 4A, the IP address monitor 410 monitors network traffic for IP address changes. For example, the IP address monitor 410 monitors for IP address assignment messages from DHCP servers to residential gateways. In addition to monitoring network traffic, the IP address monitor 410 may collect IP address change notification messages. For example, DHCP servers, residential gateways, CPEs, IMS border elements, session border controllers, and/or any other network service provider entity that processes or transmits IP address changes may send notice of IP address changes directly to the IP address monitor 410 via an IP address replacement message. The IP address replacement messages may include a SIP notify message, a DHCP Request and/or a DHCP ACK message including the replacement IP address. Upon receiving an IP address replacement message, the example IP address monitor 410 sends the IP address change information to the example transaction processor 418, which creates a new database entry. The database entry may contain a first IP address, the replacement (i.e., changed) IP address to replace the first IP address, a media access control (MAC) addresses associated with the residential gateway, time stamps associated with registrations and/or IP address transactions, and/or customer account information associated with the CPE and/or the residential gateway. For example, IP address assignment and change notification messages from a DHCP server to the LST server 160 may contain the MAC address associated with the residential gateway.

The failed transaction monitor 412 monitors network traffic for failed network transactions corresponding to an IP address change detected by the IP address monitor 410. The failed transaction monitor 412 monitors for network transactions having identifiers that include the first IP address, the replacement IP address, and/or the URL associated with the CPE and/or residential gateway associated with the changed IP address. Monitoring network traffic includes monitoring and detecting network traffic received and/or transmitted from the IMS core 120, the session border controller 114, and/or other IMS border element(s). A failed network transaction includes a request message and a corresponding response message. For example, a SIP request and the corresponding SIP response. Failed network transactions may include, but are not limited to, a rejected transaction, a lost transaction, a misdirected transaction, an un-routable transaction, and/or an unresolved transaction. A rejected transaction may include, for example, a rejected phone call to a VoIP phone with a newly changed IP address. A misdirected or an un-routable transaction may occur, for example, when the IMS core 120 and/or the session border controller 114 of a network service provider is unable to send data packets to a personal computer connected to a residential gateway with a newly changed IP address. An un-resolved transaction may occur, for example, when the session border controller 114 is unable to successfully send packets (e.g., a SIP INVITE packet) to a residential gateway due to a mismatch between the previous and current IP address of the residential gateway.

The example failed transaction monitor 412 provides the detected failed network transactions to the transaction processor 418 either directly or by writing data representing the transaction to a memory accessible by the transaction processor 418. Alternatively, the failed network transaction monitor 412 may provide a copy and/or an indication of the failed network transaction. The example transaction processor 418 compares the failed network transactions to a set of monitoring rules 420. If there is a match to at least one monitoring rule 420, then the transaction processor 418 stores the failed network transaction to the database entry. If there is not at least one match to at least one monitoring rule 420, then the transaction processor 418 discards the failed network transaction. The example monitoring rules 420 provide criteria in the form of rules and/or policies that enable a rule-based policy engine implemented by the transaction processor 418 to determine if a failed network transaction is a result of a changed IP address. Additionally, the monitoring rules 420 may be stored within a monitoring rules cache and may be added, updated, changed, and/or removed by a network service provider administrator. In some circumstances, a failed network transaction may match two or more monitoring rules 420. In some examples, a match of two rules must occur for the failed network transaction to be recorded. Additionally or alternatively, a monitoring rule 420 may comprise two messages such as for example, a SIP request and a corresponding SIP response. For example, the failed network transaction monitor 412 detects and stores a SIP Invite request message from a first CPE to a second CPE with a newly replaced IP address and the corresponding SIP 4XX, 5XX, or 6XX (e.g., a SIP 408 Request Timeout) response message from the IMS core associated with the second CPE (that is unsuccessfully called) to the first CPE (that attempts the call). The transaction processor 418 links the SIP request message to the SIP response message and compares the linked SIP request-SIP response to the monitoring rules 420. If the linked SIP request-SIP response matches at least one monitoring rule the network transaction is determined to be a failed network transaction and the transaction processor 418 stores the SIP request-SIP response failed network transaction to the database entry.

The example registration monitor 414 monitors IP address registration changes within a SIP registrar, within a session border controller, and/or within an IMS border element of the network service provider. Monitoring IP address changes may include receiving and/or detecting a registration notification message from the SIP registrar, the IMS core, and/or the session border controller. Additionally, monitoring IP address changes of the residential gateway may include receiving notifications from the DHCP server. Upon receiving a notification message that the replacement IP address is assigned, the example transaction processor 418 compiles the IP address change information and the associated failed network transactions added to the database entry within the transaction processor 418 and stores the database entry (or entries) to a database entry cache 416. Additionally or alternatively, the transaction processor 418 may create one or more new database entries and store the new database entry (or entries) to the database entry cache 416. As such, the example transaction processor 418 stores each failed network transaction and/or IP address assignment message to the database entry (or entries) within the database entry cache 416 when a message and/or transaction is received and/or detected that meets the criteria within the monitoring rules 420.

In the illustrated example of FIG. 4A, the LST server 160 includes a data analyzer 422 and a report generator 424 to process, summarize, and publish data associated with the stored database entries within the database entry cache 416. A network service provider administrator may initiate the data analyzer 422, and/or the data analyzer 422 may process the database entries at specified time periods, when the database entry cache 416 is full and/or meets a capacity requirement. The example data analyzer 422 may process all of the stored database entries and/or the data analyzer 422 may process database entries that meet criteria that is preprogrammed into the data analyzer 422 and/or selected by a network service provider administrator. The data analyzer 422 accesses the database entries within the database entry cache 416 by providing the example transaction processor 418 some criteria for selecting and filtering the database entries. The selected database entries are compiled and processed by the data analyzer 422 into groupings that may include, but are not limited to, a network transaction failure type, a subscriber, a location, a time period, a duration of LST, etc. The data analyzer 422 then computes statistics for each group and/or sums the statistics across the groups. For example, the data analyzer 422 may separate the database entries into groups by network transaction failure type and then sum the number of network transactions per group. In another example, the data analyzer 422 may group the failed network transactions by subscriber, sum the total number of LST minutes for each subscriber, and find the average LST and total LST for the subscribers analyzed. The analyzed data is transmitted from the data analyzer 422 to the report generator 424.

The example report generator 424 of the example LST server 160 produces reports based on the analyzed data of failed network transactions due to an IP address change. The reports may be used to determine the cause of a loss of service for a subscriber. For example, if a subscriber reports a loss of service to the associated network service provider, the network service provider may access a report generated for the subscriber to determine if the loss of service reported by the subscriber correlates to an IP address change and subsequent failed network transactions. Additionally, the reports may summarize loss of service instances due to changes in IP address and the corresponding LST for government inquiries (e.g., performance audits), business inquiries, consumer inquiries, and/or for marketing purposes. The network service provider may use the reports to plan design changes to the communication system of the network service provider to minimize and/or eliminate loss of service and the associated LST. Such design changes may include improvements to the IMS core, the session border controller(s), the DHCP server, and/or communication between the communication system entities.

While the example LST server 160 has been illustrated in FIG. 4A, the devices, networks, systems, servers and/or processors illustrated in FIG. 4A may be combined, divided, re-arranged, eliminated and/or implemented in any way. For example, the example bus 404, the example IP address monitor 410, the example failed network transaction monitor 412, the example registration monitor 414, the example the transaction processor 418, the monitoring rules 420, the example database entry cache 416, the example data analyzer 422, and/or the example report generator 424 illustrated in FIG. 4A may be implemented separately and/or in any combination using, for example, machine accessible instructions executed by one or more computing devices and/or computing platforms (e.g., the example processing platform 1000 of FIG. 10). Further, the example bus 404, the example IP address monitor 410, the example failed network transaction monitor 412, the example registration monitor 414, the example the transaction processor 418, the monitoring rules 420, the example database entry cache 416, the example data analyzer 422, the example report generator 424 and/or, more generally, the example LST server 160 may be implemented by hardware, software, firmware and/or any combination of hardware, software and/or firmware. Thus, for example, any of the example bus 404, the example IP address monitor 410, the example failed network transaction monitor 412, the example registration monitor 414, the example the transaction processor 418, the monitoring rules 420, the example database entry cache 416, the example data analyzer 422, the example report generator 424 and/or, more generally, the example LST server 160 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example bus 404, the example IP address monitor 410, the example failed network transaction monitor 412, the example registration monitor 414, the example the transaction processor 418, the monitoring rules 420, the example database entry cache 416, the example data analyzer 422, the example report generator 424, and/or the example LST server 160 are hereby expressly defined to include a tangible medium such as a memory, DVD, CD, etc. storing such software or firmware. Further still, the example LST server 160 may include additional devices, servers, systems, networks, gateways, portals, and/or processors in addition to, or instead of, those illustrated in FIG. 4A and/or may include more than one of any or all of the illustrated devices, servers, networks, systems, gateways, portals, and/or processors.

Figure 4B:
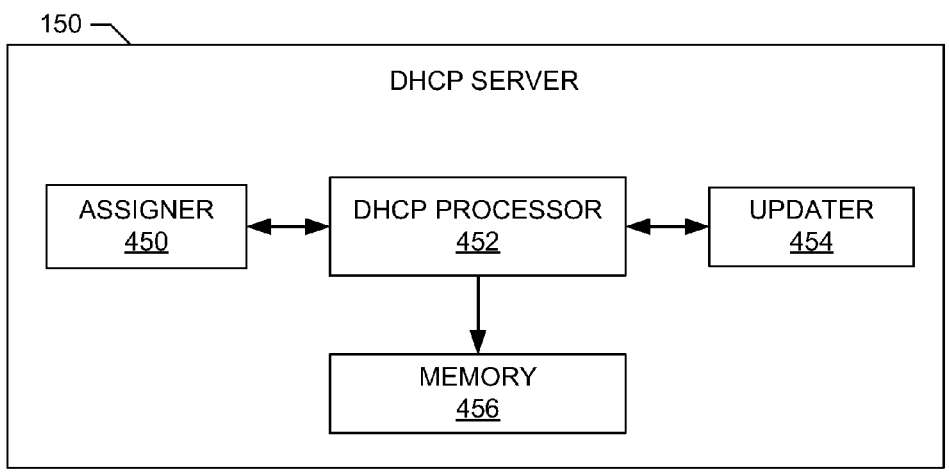
FIG. 4B is a block diagram of the example DHCP server of FIGS. 1A, 1B, and 2.

FIG. 4B is a block diagram of the example DHCP server 150 of FIGS. 1A, 1B, and/or 2. The example DHCP server 150 includes an assigner 450, a DHCP processor 452, an updater 454, and a memory 456. The example DHCP server 150 is part of a network service provider such as, for example, the Network Service Provider A 110 of FIGS. 1A, 1B, and/or 2. Additionally, the DHCP server 150 may be a single server or may include a plurality of servers within the Network Service Provider A 110. In the illustrated example of FIG. 4, the DHCP server 150 administers network parameter assignments by assigning IP addresses, subnet masks, default gateways, and/or other IP parameters to residential gateways. For example, dynamic IP parameters may be leased to a subscribing CPE or residential gateway for any period of time (e.g., a few minutes, a few hours, a few months, etc.).

The IP addresses, subnet masks, default gateways, and/or other IP parameters are stored in the memory 456. The memory 456 is partitioned into a pool of assigned IP addresses and non-assigned IP addresses. The assigned IP addresses are associated with various IP parameters such as the MAC address of the assigned residential gateway and/or the lease time of the IP address. The non-assigned IP addresses are available in the memory 456 for the assigner 450 to assign to one or more servers and/or residential gateways. The assigner 450 manages the assignment of the IP addresses and communicates with entities with IP addresses (e.g., residential gateway(s)). The DCHP processor 452 manages the assignment of the IP addresses and the lease times of assigned IP addresses.

For example, the DCHP processor 452 providers the assigner 450 a replacement IP address upon the assigner 450 receiving an initial request from the residential gateway 104 for an IP address to replace a first IP address with an expiring lease. The DCHP processor 452 selects the replacement IP address from the pool of non-assigned IP addresses in the memory 456. Additionally, the DCHP processor 452 removes the replacement IP address from a list of non-assigned IP addresses. The assigner 450 then sends the residential gateway the replacement IP address. Upon assignment of the replacement IP address, the assigner 450 sends an indication to the DCHP processor 452 that the replacement IP address was assigned. Upon receiving the indication, the DCHP processor 452 links the replacement IP address to the network address (e.g., the MAC) of the residential gateway and stores the replacement IP address to the pool of assigned IP addresses in the memory 456. The DHCP server may determine that an assigned address was accepted by the residential gateway by monitoring for subsequent assignment requests in a brief time period, by sending one or more PING packets to the residential gateway, and/or by any other suitable mechanism. Additionally, the DCHP processor 452 returns the first IP address after a time period to the pool of non-assigned IP addresses. The time period provides enough time for a session border controller to refresh its URL-IP address mapping by replacing the first IP address with the replacement IP address when the corresponding CPE registers with its associated network service provider. The time period may be a few minutes or longer (e.g., to an hour). Alternatively, if the DHCP server 150 determines that the replacement IP address was not successfully assigned, the DCHP processor 452 stores the replacement IP address to the pool of non-assigned IP addresses.

In another circumstance, if a lease time for an IP address is expired and/or close to expiring, the residential gateway issues a DHCP request to the DHCP server 150, the DCHP processor 452 selects a replacement IP address from the pool of non-assigned IP addresses and provides the assigner 450 the replacement IP address to send to the associated residential gateway. Additionally, if the IP address is expired, the DCHP processor 452 may remove the link between the network address of the residential gateway and the expired IP address and add the expired IP address to the pool of non-assigned IP addresses.

The example updater 454 of FIG. 4B sends an IP address replacement message to the LST server 160 of FIGS. 1A, 1B, 2, and 4A upon the DCHP processor 452 assigning an IP address. The IP address replacement message informs the LST server 160 of an IP address change. Additionally, the example updater 454 sends a replacement IP address message to the session border controller 114 of FIGS. 1A, 1B, and 2. By sending the replacement IP address message, the DHCP server 150 registers the replacement IP address within the session border controller 114 before the CPE registers at the end of its registration time period. LST is reduced by the updater 454 sending the register message upon the DCHP processor 452 assigning an IP address because the session border controller 114 receives the replacement IP address before the end of a time period at the end of which the CPE registers.

While the example DHCP server 150 has been illustrated in FIG. 4B, the devices, networks, systems, servers and/or processors illustrated in FIG. 4B may be combined, divided, re-arranged, eliminated and/or implemented in any way. For example, the example assigner 450, the example DCHP processor 452, the example updater 454, and/or the example memory 456 illustrated in FIG. 4B may be implemented separately and/or in any combination using, for example, machine accessible instructions executed by one or more computing devices and/or computing platforms (e.g., the example processing platform 1000 of FIG. 10). Further, the example assigner 450, the example DCHP processor 452, the example updater 454, the example memory 456 and/or, more generally, the example DHCP server 150 may be implemented by hardware, software, firmware and/or any combination of hardware, software and/or firmware. Thus, for example, any of the example assigner 450, the example DCHP processor 452, the example updater 454, the example memory 456 and/or, more generally, the example DHCP server 150 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example assigner 450, the example DCHP processor 452, the example updater 454, the example memory 456, and/or the example DHCP server 150 are hereby expressly defined to include a tangible medium such as a memory, DVD, CD, etc. storing such software or firmware. Further still, the example DHCP server 150 may include additional devices, servers, systems, networks, gateways, portals, and/or processors in addition to, or instead of, those illustrated in FIG. 4B and/or may include more than one of any or all of the illustrated devices, servers, networks, systems, gateways, portals, and/or processors.

Figure 5:
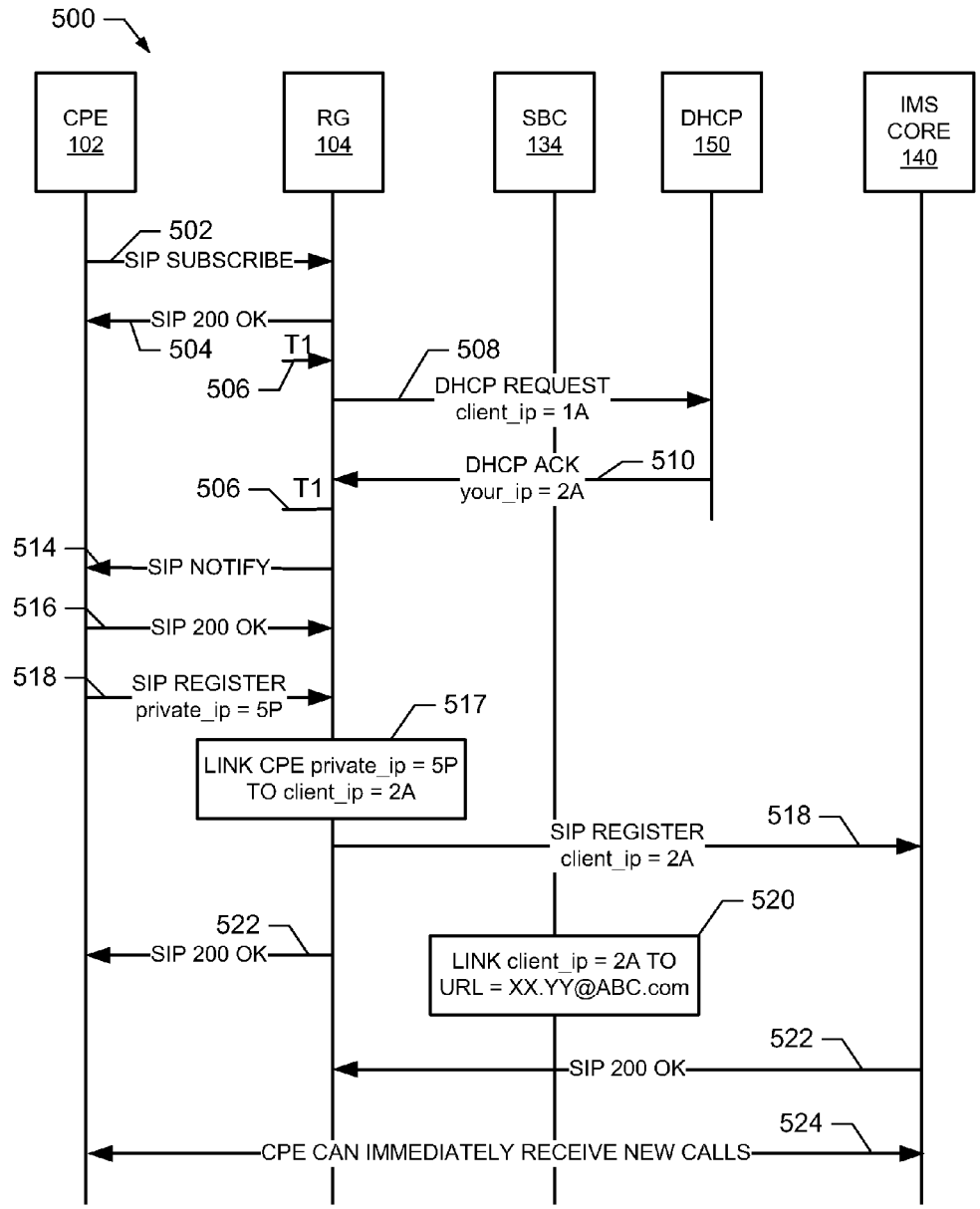
FIG. 5 illustrates example protocol message exchanges in a communication session that may be executed by the example CPE, the example residential gateway, the example DHCP server, and/or the example IMS core of FIGS. 1A and 1B.

FIG. 5 illustrates example protocol message exchanges in a communication session 500 that may be executed by the example CPE 102, the example residential gateway 104, the example DHCP server 150, the session border controller 134 (SBC), and/or the example IMS core 140 of FIGS. 1A and 1B. The example communication session 500 begins when the CPE 102 sends a SIP Subscribe message 502 to the residential gateway 104. In response to the received SIP Subscribe message 502, the residential gateway 104 sends a SIP 200 OK response message 504 to acknowledge receipt of the SIP subscribe message 502. The CPE 102 subscribes to the residential gateway 104 upon activation of the CPE 102, at periodic times, at scheduled times, and/or upon request by, for example, a network service provider administrator.

At some time period T1 506 later, the lease on the IP address within the residential gateway 104 expires. As a result, the residential gateway 104 requests a new IP address by sending a DHCP Request message 508 to the DHCP server 150 within the Network Service Provider A 110 of FIGS. 1A and 1B. Included in the DHCP Request message 508 is the current IP address 1A assigned to the residential gateway 104. Upon receiving the DHCP Request message 508, the DHCP server 150 sends a DHCP ACK (i.e., ACKNOWLEDGE) message 510 including the replacement IP address 2A assigned to the residential gateway 104. Upon receipt of the DHCP ACK message 510, the residential gateway 104 resets the lease time period T1 506 and sends a SIP Notify message 514 to the example CPE 102. In another example, the DHCP server 150 may send a DHCP ACK message including the IP address 1A indicating the IP address 1A license is renewed without assigning a replacement IP address. Additionally, the residential gateway 104 and/or the DHCP server 150, may send a replacement IP address message (not shown) to the LST server 160 of FIGS. 1A, 1B, 2, and/or 3.

Upon receiving the replacement IP address 2A in the example communication session 500, the example CPE 102 sends a SIP 200 OK message 516 to acknowledge receipt of the SIP Notify message 514 and immediately transmits a SIP Register message 518 including its private IP address 5P. The CPE 102 sends the SIP Register message 518 to the IMS core 140 of the associated network service provider (e.g., Network Service Provider 130 B) by sending the SIP Register message 518 to the residential gateway 104. Upon receiving the SIP Register message 518, the residential gateway 104 links the private IP address 5P to the replacement IP address 2A, replaces the private IP address 5P with the replacement IP address 2A in the SIP Register message 518, and forwards the Register message 518 to the IMS core 140 of the Network Service Provider B 130. The Register message 518 passes through the session border controller 134 causing the session border controller 134 to update the URL-IP address mapping by replacing the 1A IP address with the 2A IP address and linking 520 it to the XX.YY@ATT.com URL of the CPE 102. Upon receiving the SIP Register message 518, the IMS core 140 sends the residential gateway 104 a SIP 200 OK response message 522 to acknowledge receipt of the SIP Register message 518. The residential gateway 104 then forwards the SIP 200 OK response message 522 to the CPE 102 through the session border controller 134. The session border controller 134 confirms its update of the IP address change. At this point the CPE 102 is capable of receiving calls directed from the IMS core 140 of the Network Service Provider B 130 which contains the updated IP address 2A assigned to the residential gateway 104. Alternatively, if the CPE 102 had been registered with the Network Service Provider A 110, the resulting message flows would have included the messages shown in FIG. 5 with the IMS core 120 and the session border controller 114 (additionally, the session border controller 114 might have also sent a message (not shown) to LST server 160 to indicate the IP address mapping change).

FIGS. 6, 7, 8, and 9 are flowcharts representative of example machine readable instructions that may be executed to minimize CPE downtime in a VoIP service network. The example machine readable instructions may be executed using, for example, a processor system such as the system 1000 of FIG. 10. However, one or more of the blocks depicted in the flowcharts may be implemented in any other manner, including by dedicated purpose circuitry, manual operations, etc. Additionally, although the example instructions are described with reference to the flowcharts of FIGS. 6, 7, 8, and 9, other methods to minimize CPE downtime in a VoIP service network may additionally or alternatively be used. For example, the order of execution of the blocks depicted in the flowcharts of FIGS. 6, 7, and 8 may be changed, and/or some of the blocks described may be rearranged, eliminated, or combined.

Figure 6:
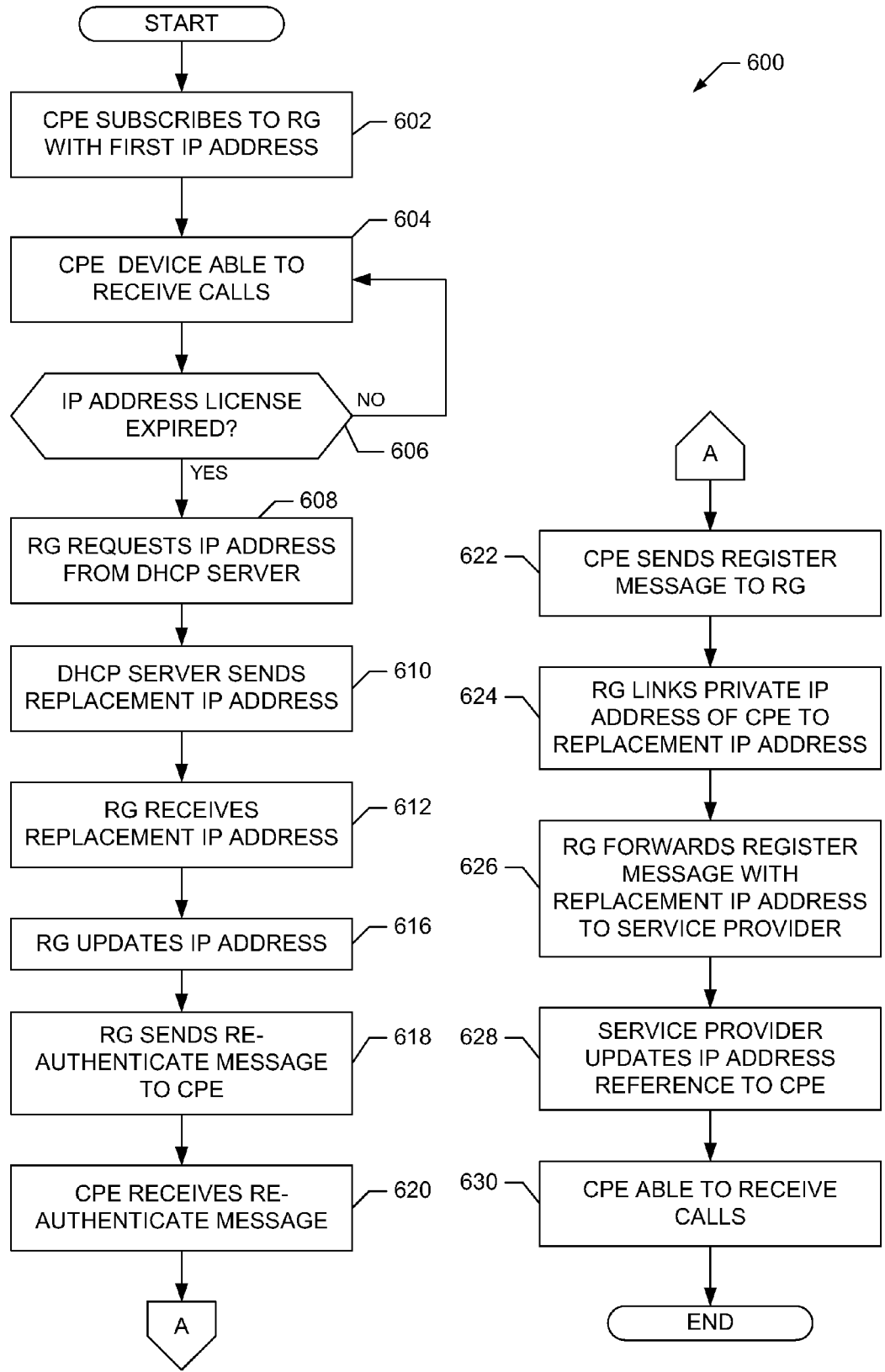
FIG. 6 is a flowchart representative of example machine accessible instructions that may be executed by, for example, a processor to implement any or all of the example residential gateway and/or the example CPE of FIGS. 1A, 1B and/or 3.

The example instructions 600 represented by FIG. 6 may be performed to implement the example residential gateway 104 and/or the example CPE of FIGS. 1A, 1B, and 3. The example instructions 600 may be executed at predetermined intervals, based on an occurrence of a predetermined event, in response to a user request, etc., or on any combination thereof. For example, the instructions 600 may be executed at predetermined intervals, such as hourly, daily, etc. Additionally or alternatively, the example instructions 600 may be executed upon the occurrence of a trigger generated remotely such as, for example, the residential gateway 104 receiving a replacement IP address and/or the CPE 102 subscribing to the residential gateway 104.

The example instructions 600 of FIG. 6 begin at block 602 where the CPE 102 subscribes to the residential gateway 104 (i.e., RG). The CPE 102 subscribes to the residential gateway 104 to inform the residential gateway 104 to send the CPE 102 a re-authenticate message when the residential gateway receives a replacement IP address. Alternatively, the residential gateway 104 may send the CPE 102 a re-authenticate message without the CPE 102 subscribing to the residential gateway 104. At this point the CPE 102 is able to receive calls and/or packet data from the associated network service provider (block 604). The residential gateway 104 checks if the lease for the assigned first IP address is expired (block 606). If the lease has not expired, control returns to block 604. However, when the lease has expired, the residential gateway 104 requests an IP address from a DHCP server within the associated network service provider (e.g., Network Service Provider A 110 of FIG. 1A) (block 608). The DHCP server 150 responds by sending a replacement IP address to replace the first IP address in the residential gateway 104 (block 610). Alternatively, the DHCP server may send the residential gateway 104 a replacement IP address to replace the first IP address without a request from the residential gateway 104.

The residential gateway 104 receives the replacement IP address from the DHCP server (block 612). Upon receiving the replacement IP address (block 612), the residential gateway 104 updates the IP address within its IP address cache (block 616) and sends a re-authenticate message to the communicatively coupled CPE 102 (block 618). As described above, the residential gateway 104 may send the re-authenticate message to the CPE 102 within a SIP Notify message. Additionally, the residential gateway 104 may send a replacement IP address message to the LST server 160 of FIG. 4. Upon the CPE 102 receiving the re-authenticate message (block 620), the CPE 102 immediately registers with the associated network service provider by sending a register message (block 622). The register message may include, for example, a SIP Register message. The network service provider associated with the CPE 102 may be the same network service provider associated with the residential gateway 104 or alternatively, a different network service provider.

The residential gateway 104 receives the register message from the CPE 102 and links (e.g., re-addresses) the private IP address of the CPE 102 to the replacement IP address (block 624). The residential gateway then replaces the private IP address with the replacement IP address within the register message and forwards the register message to the associated network service provider of the CPE 102 (block 626). The network service provider receives the register message and updates it records by replacing the first IP address with the replacement IP address in records linking the CPE identification information to an IP address (block). The records may be included in a session border controller and/or a P-CSCF server. When the replacement IP address is registered with the CPE-associated network service provider and the CPE network service provider is able to route calls to the CPE (block 630), the instructions end.

Figure 7:
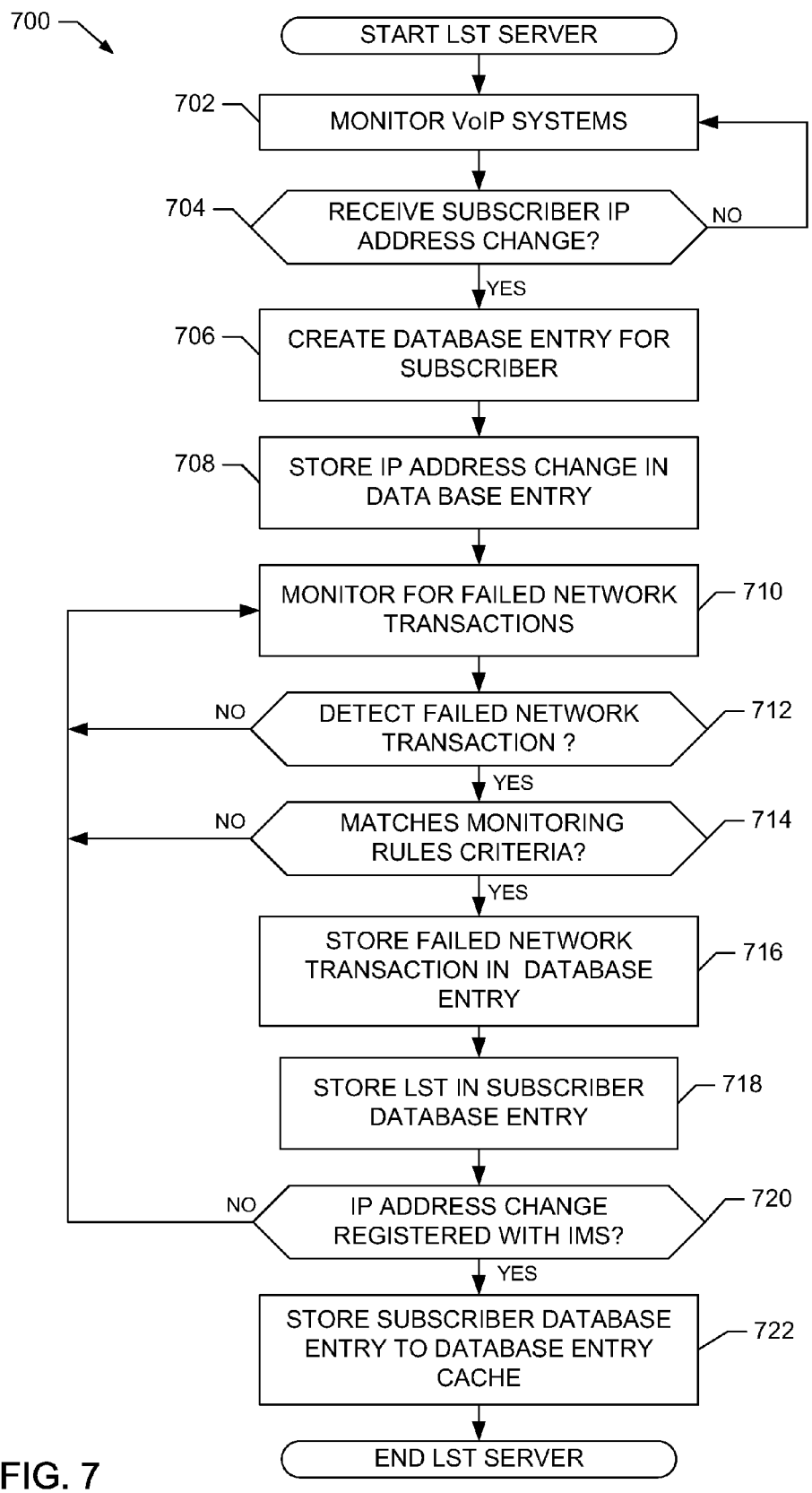
FIG. 7 is a flowchart representative of example machine accessible instructions that may be executed by, for example, a processor to implement any or all of the example LST server of FIGS. 1A, 1B, 2 and/or 3.

The example machine readable instructions 700 represented by FIG. 7 may be performed to implement the example LST server 160 of FIGS. 1A, 1B, 2, and 4. The example instructions 700 may be executed at predetermined intervals, based on an occurrence of a predetermined event, in response to a user request, etc., or any combination thereof. For example, the instructions 700 may be executed at predetermined intervals, such as hourly, daily, etc. Additionally or alternatively, the example instructions 700 may be executed upon the occurrence of a trigger generated remotely such as, for example, by a network service provider initiating and/or activating the LST server 160.

The instructions 700 begin at block 702 where the LST server 160 of FIGS. 1A, 1B, 2, and 4 monitors a VoIP service network. The LST server 160 determines if the IP address monitor 410 has received an IP address change of a subscriber (block 704). If the LST server 160 has not received an IP address change notification, control returns to block 702. It should be noted that an initial IP address assignment message (e.g., from a DHCP server containing a MAC address) is considered an (initial) IP address change in this context, where the IP address assignment message does not include a prior IP address. However, if the LST server 160 receives an IP address change notification, control proceeds to block 706 where the transaction processor 418 of the LST server 160 creates a database entry corresponding to the subscriber with the IP address change. The LST server 160 may initiate a new instance of block 706 for every IP address change notification received. Next the IP address change is stored in the database entry (block 708). The database entries related to a specific residential gateway may be correlated at any time using the IP addresses assigned to the residential gateway and the MAC address of the residential gateway. In some implementations, the MAC address is used to identify each unique subscriber. Accordingly, one or more subsequent database entries associated with the MAC address correspond to events associated with that subscriber. Next, the LST server 160 monitors for failed network transactions associated with the IP address change (block 710).

Control dwells at block 710 until a failed network transaction is detected (block 712). When a failed network transaction is detected (block 712), the LST server 160 determines if the failed network transaction matches at least one monitoring rule 420 (block 714). If the failed network transaction matches at least one monitoring rule, control proceeds to block 716. On the other hand, if the failed network transaction does not match at least one monitoring rule (block 714), the failed network transaction is discarded and control returns to block 710. In some examples, the failed network transaction must match two or more monitoring rules for control to proceed to block 716. Although for simplicity of illustration, the blocks of FIGS. 6, 7, 8, and 9 are shown as progressing serially in time, any or all of the blocks may be executed in parallel. For example, multiple threads may be spawned executing multiple instances of some or all of the blocks to effectively monitor for and analyze failed network transactions.

The LST server 160 stores data representative of the failed network transaction to the corresponding database entry (block 716). Then, the LST server 160 stores the LST from the time of the notification of the IP address change to when the failed network transaction was stored in the database entry (block 718). Next, the LST server 160 checks with the registration monitor 414 to determine if the residential gateway and/or the CPE associated with the subscriber has sent an IP address registration message to the associated IMS core (block 720). If the IP address change has not been registered, control returns to block 710 and the LST server 160 continues to monitor for failed network transactions. If the changed IP address has been registered with the associated session border element, control proceeds to block 722 where the database entry is stored by the transaction processor 418 to the database entry cache 416. The example instructions 700 then terminate.

Figure 8:
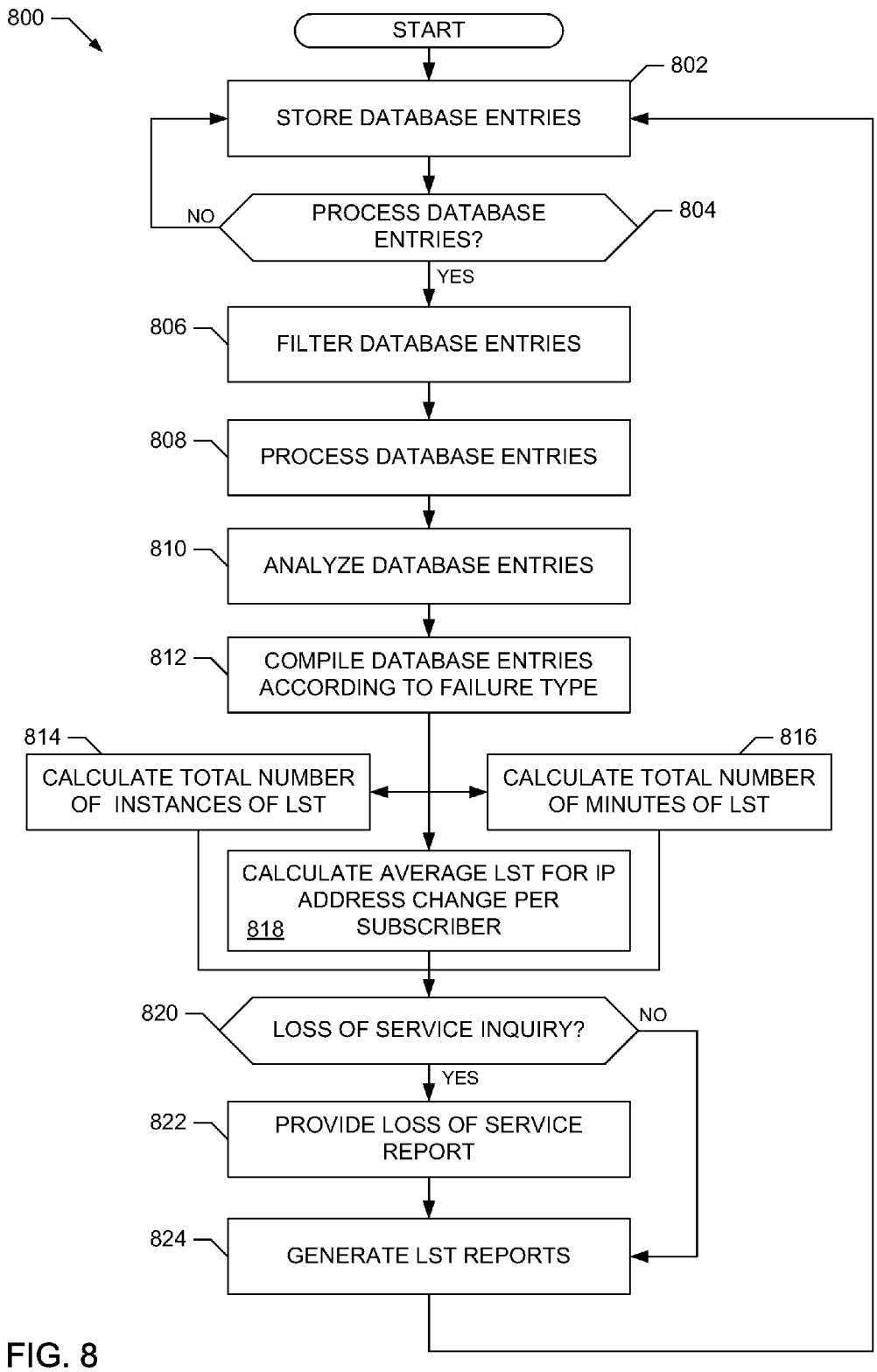
FIG. 8 is a flowchart representative of example machine accessible instructions that may be executed by, for example, a processor to implement any or all of the example transaction processor, data analyzer and/or the example report generator within the LST server of FIG. 4A.

The example machine readable instructions 800 represented by FIG. 8 may be performed to implement the example transaction processor 418, example data analyzer 422, the example report generator 424 and/or the example LST server 160 of FIG. 4A. The example instructions 800 may be executed at predetermined intervals, based on an occurrence of a predetermined event, based on a user input etc., or any combination thereof. For example, the instructions 800 may be executed at regular intervals, such as hourly, daily, etc. Additionally or alternatively, the example instructions 800 may be executed upon the occurrence of a trigger generated remotely such as, for example, by the storage of a database entry to the database entry cache 416 by the transaction processor 418 within the LST server 160 and/or by a report generation message from a network service provider administrator.

The instructions 800 begin at block 802 where the LST server 160 stores database entries to the database entry cache 416 of FIG. 4. An indication of a report generation request may be stored in the database entry cache 416 in block 802 if such a request is received by the LST server 160. The LST server 160 then checks to determine if the database entries should be processed (block 804). A network service provider administrator may determine when to process the database entries and/or the LST server 160 may include predefined criteria for when to process the database entries such as, for example, a capacity limit on the number of database entries within the database entry cache 416. Additionally, the LST server 160 may process the database entries at predefined time periods such as, for example, every Tuesday at 9:00 A.M. If the LST server 160 is not instructed to process the database entries, control returns to block 802 and the LST server 160 continues to store database entries. However, if the LST server 160 is instructed to process the database entries, control proceeds to block 806. The transaction processor 418 within the LST server 160 filters the database entries based on criteria provided by the data analyzer 422 (block 806). Such filtering criteria may be defined by a network service provider administrator. For example, the LST server 160 filters criteria to retrieve and analyze records of database entries that relate to all of the IP address events and call failures for a residential gateway with a specific MAC address associated with a particular subscriber.

Once the database entries are filtered, the data analyzer 422 processes the example database entries (block 808) by, for example, organizing the database entries according to the parameters to be analyzed. Then, the processed database entries are analyzed (block 810) based on, for example, the criteria provided by a network service provider administrator. Additionally, or alternatively, the database entries may be analyzed according to predefined criteria. The analysis may include, without limitation, identifying the types of failed network transactions, subscriber information, location information, time-based information, and/or lengths of LST within the database entries. The analyzed data is then compiled (block 812). In the illustrated example instructions 800 of FIG. 8, the data is compiled according to failed network transaction type. Additionally or alternatively, the data may be compiled by subscriber, location, time, demographic information, LST durations, etc.

In the example instructions 800 of FIG. 8, the compiled data is directed to at least three example types of calculations including, for example, calculating the total number of instances of LST (block 814), calculating the average LST for an IP address change for each subscriber (block 818), and calculating the total number of minutes of LST (block 816). In other examples, the compiled data may include fewer calculations or more calculations such as, for example, calculating the number of failed network transactions for each failed network transaction type, calculating the number of IP address changes per subscriber, correlating LST to subscriber location and/or subscriber demographic type, etc. Once the calculations are complete, control proceeds to block 820 where the LST server 160 determines if there is a loss of service inquiry. If there is a loss of service inquiry, control proceeds to block 822.

The report generator 424 creates a report from the calculated data to respond to the loss of service inquiry (block 822). For example, a subscriber may call their associated network service provider to inquire about a time period in which they were unable to receive calls on their VoIP phone. The network service provider may generate a report for the subscriber and determine if an IP address change was the cause for the loss of service. The report generator 424 may create a loss of service report (block 822) for one or more loss of service inquires from one or more subscribers. Then, the report generator 424 creates LST reports (block 824). Additionally, if there are no loss of service inquiries (block 820), control proceeds to block 824. The generated LST reports may include summaries of LST, number of instances of LST, various charts of failed network transaction types, LST by location, LST by time of day, etc. The reports may be generated for government audits, for marketing purposes, for business reports, and/or for the network service provider designs to improve and/or eliminate instances of loss of service and the corresponding LST. Control then returns to block 802, where the LST server 160 may await additional entries or processing requests from a network service provider administrator.

Figure 9:
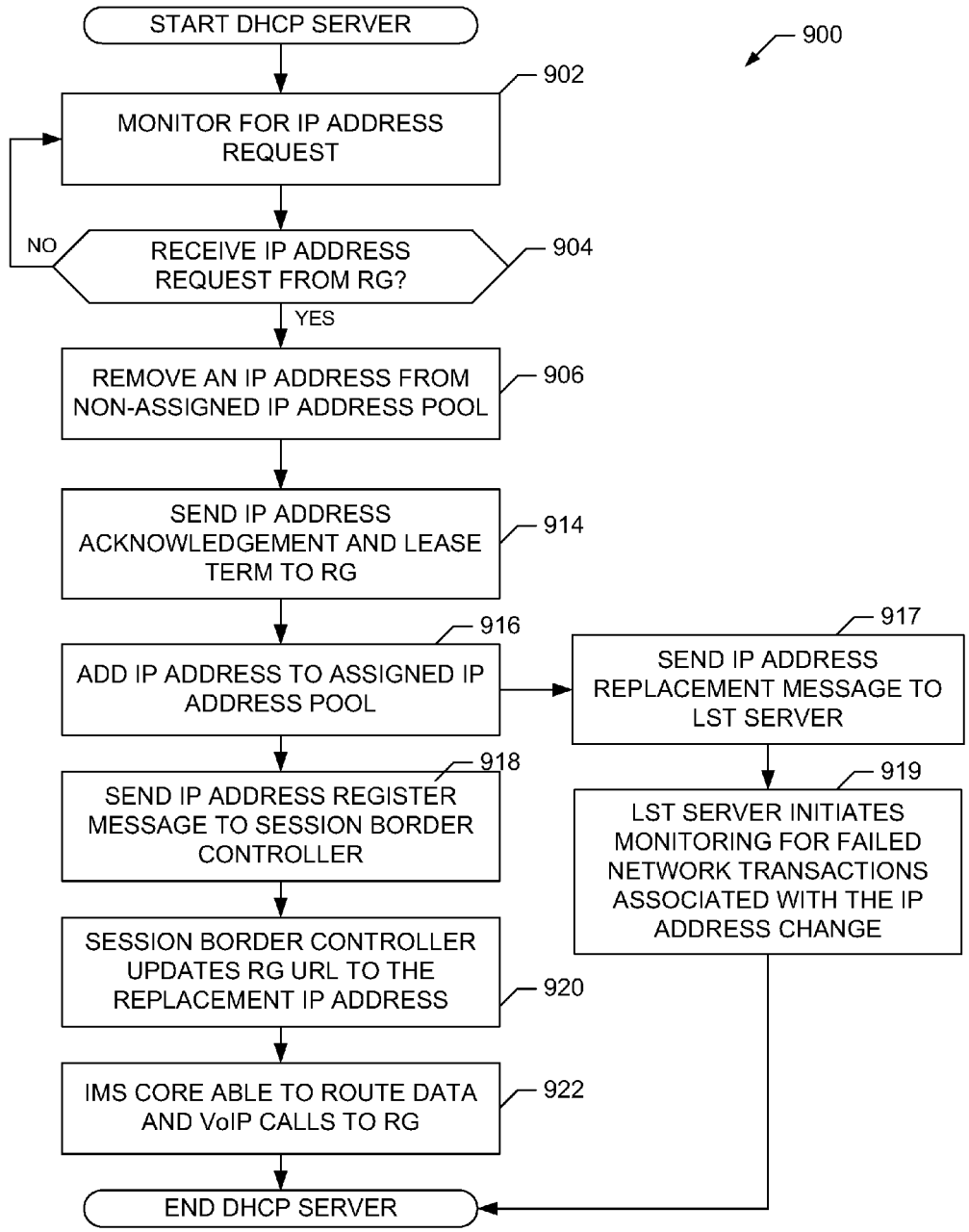
FIG. 9 is a flowchart representative of example machine accessible instructions that may be executed by, for example, a processor to implement any or all of the example DHCP server of FIG. 4B.

The example machine readable instructions 900 represented by FIG. 9 may be performed to implement the example assigner 450, example DHCP processor 452, the example updater 454, the example memory 456, and/or the example DHCP server 150 of FIG. 4B. The example instructions 900 may be executed at predetermined intervals, based on an occurrence of a predetermined event, based on a user input etc., or any combination thereof. For example, the instructions 900 may be executed at regular intervals, such as hourly, daily, etc. Additionally or alternatively, the example instructions 900 may be executed upon the occurrence of a trigger generated remotely such as, for example, by the request for an IP address by a residential gateway. While the DHCP protocol may allow for support of multiple DHCP servers and more than one DHCP server may exist, only one DHCP server 150 is discussed herein without loss of generality.

The instructions 900 begin at block 902 where the DHCP server 150 monitors for IP address request(s) from residential gateway(s). Control dwells at block 902 until the DHCP server 150 receives a request for an IP address from a residential gateway (block 904). When an IP address is requested (block 904), the DHCP processor 452 in the DHCP server 150 removes a replacement IP address from the pool of non-assigned IP addresses (block 906). The DHCP server 150 may remove a different replacement IP address from the pool of non-assigned IP addresses (block 906) for every instance of an IP address request (block 904). Additionally, the DHCP server 150 may re-use the IP address previously assigned to the residential gateway and re-issue that same address as a replacement IP address in block 906.

Next the DHCP server 150 sends a replacement IP address, lease term, and/or other optional related parameters to the residential gateway (block 914). Additionally, the DHCP processor 452 adds the replacement IP address to the pool of assigned IP addresses (916), sends an IP address register message to the corresponding session border controller 114 (if the CPE receives service from the same network service provider as the residential gateway) (block 918), and sends an IP address replacement message to the LST server 160 (block 917). Upon receiving the replacement IP address (block 917), the LST server 150 initiates monitoring for failed network transactions associated with the IP address change. Upon receiving the IP address register message (block 918), the session border controller 114 updates a record linking the URL of the residential gateway to the replacement IP address (block 920). At this point the session border controller 114 and/or the IMS core 120 are able to route data and VoIP calls to a CPE communicatively coupled to the residential gateway via the replacement IP address (block 922). The example instructions 900 then terminate.

Figure 10:
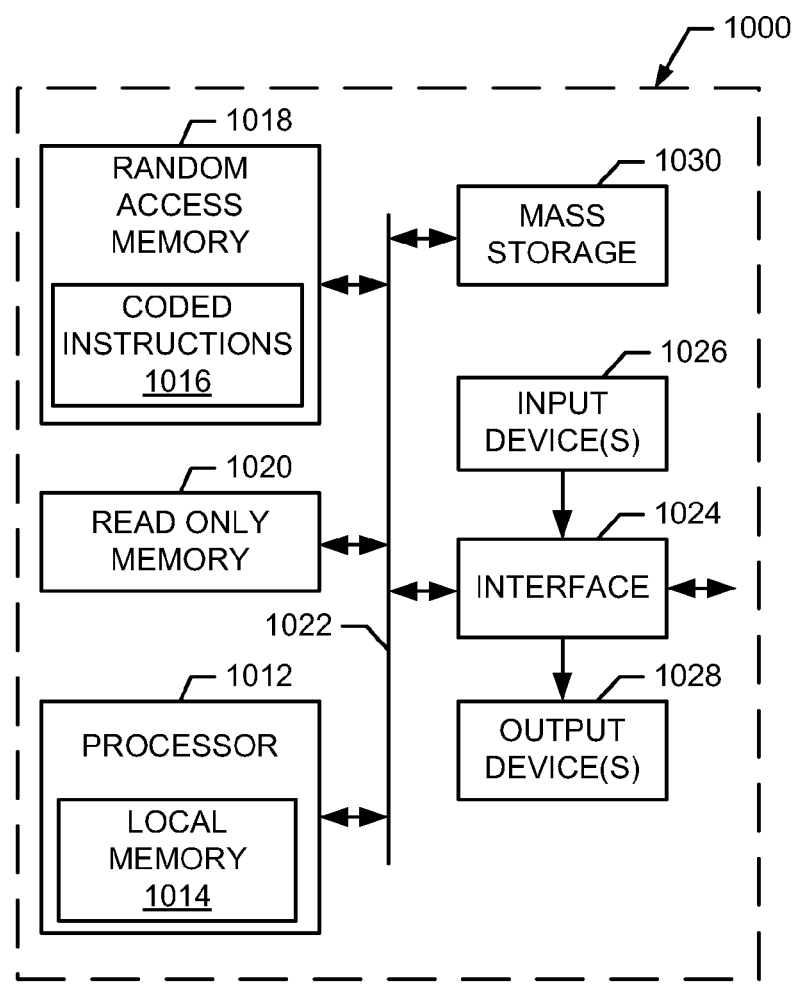
FIG. 10 is a schematic illustration of an example processor platform that may be used and/or programmed to carry out the protocol message exchanges and/or the example machine accessible instructions of FIGS. 6, 7, 8 and/or 9 to implement any or all of the example methods and systems described herein.

FIG. 10 is a block diagram of an example computer system 1000 capable of implementing the systems and methods disclosed herein. The computer 1000 can be, for example, a server, a personal computer, a personal digital assistant (PDA), an internet appliance, a DVD player, a CD player, a digital video recorder, a personal video recorder, a set top box, or any other type of computing device. Any or all of the example residential gateway 104, the example CPE 102, the example LST server 160, the example DHCP server 150, the example IMS core 120, and/or the example session border controller 114 may be implemented by the example computer 1000.

The system 1000 of the illustrated example includes a processor 1012 such as a general purpose programmable processor. The processor 1012 includes a local memory 1014, and executes coded instructions 1016 present in the local memory 1014 and/or in another memory device. The coded instructions 1016 may include some or all of the instructions represented in FIGS. 6, 7, 8, and 9. The processor 1012 may be any type of processing unit, such as one or more microprocessors from the Intel® Centrino® family of microprocessors, the Intel® Pentium® family of microprocessors, the Intel® Itanium® family of microprocessors, the Intel® Core® family of microprocessors, and/or the Intel® XScale® family of processors. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller.

The computer 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1030 for storing software and data. Examples of such mass storage devices 1030 include floppy disk drives, hard drive disks, compact disk drives and digital versatile disk (DVD) drives. The mass storage devices 1030 may implement any or all of the example memory 310, the example memory 340, the example database entry cache 416, the example monitoring rules 420, and/or the example memory 456. Additionally or alternatively, the volatile memory 1018 may implement any or all of the example the example memory 310, the example memory 340, the example database entry cache 416, the example monitoring rules 420, and/or the example memory 456.

At least some of the above described example methods and/or system are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to reduce customer premises equipment downtime in a Voice over Internet Protocol service network, the method comprising:
    receiving a replacement internet protocol address to replace a first internet protocol address in a residential gateway associated with a first network service provider;
    sending a re-authenticate message from the residential gateway to a customer premises equipment;
    linking a private internet protocol address associated with the customer premises equipment to the replacement internet protocol address after receiving a register message from the customer premises equipment;
    sending the register message including the replacement internet protocol address to a second network service provider associated with the customer premises equipment; and
    sending an internet protocol address replacement message to a lost subscriber time server in response to receiving the replacement internet protocol address.

2. The method as defined in claim 1, wherein sending the re-authenticate message comprises at least one of forwarding, transmitting, or pushing the re-authenticate message to the customer premises equipment before receiving the register message from the customer premises equipment.

3. The method as defined in claim 1, wherein the customer premises equipment comprises first customer premises equipment, and sending the re-authenticate message further comprises sending the re-authenticate message to a second customer premises equipment.

4. The method as defined in claim 1, wherein sending the replacement internet protocol address from the residential gateway to the customer premises equipment comprises sending a session initiation protocol message.

5. The method as defined in claim 4, wherein the session initiation protocol message comprises at least one of a session initiation protocol Notify message or a session initiation protocol Info message.

6. The method as defined in claim 1, wherein sending the re-authenticate message is performed in response to the residential gateway receiving the replacement internet protocol address.

7. The method as defined in claim 1, wherein receiving the replacement internet protocol address further comprises receiving the replacement internet protocol address from a dynamic host configuration protocol server.

8. The method as defined in claim 1, wherein the replacement internet protocol address is received in response to the residential gateway requesting an internet protocol address.

9. The method as defined in claim 1, wherein the second network service provider is associated with the first network service provider.

10. A residential gateway to reduce customer premises equipment downtime in a Voice over Internet Protocol service network, comprising:
    an internet protocol address requester to receive a replacement internet protocol address from a first network service provider and to send an internet protocol address replacement message to a lost subscriber time server in response to receiving the replacement internet protocol address, the replacement internet protocol address to replace a first internet protocol address;
    a notifier to send a re-authenticate message to a customer premises equipment to initiate registration, link a private internet protocol address associated with the customer premises equipment to the replacement internet protocol address after receiving a register message, and to send the register message including the replacement internet protocol address to a second network service provider associated with the customer premises equipment, the notifier to send the re-authenticate message by at least one of forwarding, transmitting, or pushing the re-authenticate message to the customer premises equipment before receiving a register message from the customer premises equipment;
    an internet protocol address cache to store the replacement internet protocol address;
    a residential gateway processor to control the internet protocol address requester and the notifier; and
    a port to communicatively couple the notifier to the customer premises equipment device.

11. The residential gateway as defined in claim 10, wherein the notifier is to send the re-authenticate message in response to the internet protocol address requester receiving the replacement internet protocol address.

12. The residential gateway as defined in claim 10, wherein the notifier is to send the re-authenticate message from the residential gateway to the customer premises equipment by sending a session initiation protocol message.

13. The residential gateway as defined in claim 12, wherein the session initiation protocol message comprises at least one of a session initiation protocol Notify message or a session initiation protocol Info message.

14. The residential gateway as defined in claim 10, wherein the internet protocol address requester is to request the replacement internet protocol address from the first network service provider.

15. The residential gateway as defined in claim 10, wherein the internet protocol address requester is to receive the replacement internet protocol address from a dynamic host configuration protocol server associated with the first network service provider.

16. The residential gateway as defined in claim 10, wherein the internet protocol address requester is to receive the replacement internet protocol address in response to requesting the replacement internet protocol address.

17. A residential gateway to reduce customer premises equipment downtime in a Voice over Internet Protocol service network, the residential gateway comprising:
    an internet protocol address requester to receive a replacement internet protocol address from a first network service provider and to send an internet protocol address replacement message to a lost subscriber time server in response to receiving the replacement internet protocol address, the replacement internet protocol address to replace a first internet protocol address;
    a notifier to send a re-authenticate message to a customer premises equipment to initiate registration; and
    an internet protocol address resolver to link a private internet protocol address associated with the customer premises equipment to the replacement internet protocol address after receiving a register message from the customer premises equipment and to send the register message including the replacement internet protocol address to a second network service provider associated with the customer premises equipment.

18. The residential gateway as defined in claim 17, wherein the second network service provider is associated with the first network service provider.

19. A residential gateway to reduce customer premises equipment downtime in a Voice over Internet Protocol service network, the residential gateway comprising:
    an internet protocol address requester to:
        receive a replacement internet protocol address from a first network service provider, the replacement internet protocol address to replace a first internet protocol address; and
        send an internet protocol address replacement message to a lost subscriber time server in response to receiving the replacement internet protocol address; and
    a notifier to send a re-authenticate message to a customer premises equipment to initiate registration.

20. The residential gateway as defined in claim 19, wherein the lost subscriber time server is to record customer premises equipment downtime based on a time between receiving the replacement internet protocol address and registering the customer premises equipment.

21. A tangible machine accessible medium, excluding propagating signals, having instructions stored thereon that, when executed, cause a machine to at least:
    receive a replacement internet protocol address to replace a first internet protocol address in a residential gateway associated with a first network service provider;
    send a re-authenticate message from the residential gateway to a customer premises equipment;
    link a private internet protocol address associated with the customer premises equipment to the replacement internet protocol address after receiving a register message from the customer premises equipment;
    send the register message including the replacement internet protocol address to a second network service provider associated with the customer premises equipment; and
    send an internet protocol address replacement message to a lost subscriber time computer in response to receiving the replacement internet protocol address.

22. The machine accessible medium as defined in claim 21, wherein the instructions cause the machine to at least:
    send the re-authenticate message from the residential gateway to the customer premises equipment by at least one of forwarding, transmitting, or pushing the re-authenticate message to the customer premises equipment before receiving a register message from the customer premises equipment.

* * * * *